US012630146B2

(12) United States Patent
Prokes et al.

(10) Patent No.: US 12,630,146 B2
(45) Date of Patent: May 19, 2026

(54) METHOD FOR CONTROLLING AXLE LOAD DISTRIBUTION OF A VEHICLE

(71) Applicant: Volvo Truck Corporation, Gothenburg (SE)

(72) Inventors: Jakub Prokes, Gothenburg (SE); Umur Erdinc, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 130 days.

(21) Appl. No.: 17/982,875

(22) Filed: Nov. 8, 2022

(65) Prior Publication Data

US 2023/0150482 A1       May 18, 2023

(30) Foreign Application Priority Data

Nov. 17, 2021     (EP) ..................................... 21208677

(51) Int. Cl.
*B60W 30/02*       (2012.01)
*B60W 10/16*       (2012.01)
*B60W 10/22*       (2006.01)

(52) U.S. Cl.
CPC ............. *B60W 30/02* (2013.01); *B60W 10/16* (2013.01); *B60W 10/22* (2013.01);
(Continued)

(58) Field of Classification Search
CPC ...... B60W 30/02; B60W 10/16; B60W 10/22; B60W 2520/10; B60W 2520/20;
(Continued)

(56) References Cited

U.S. PATENT DOCUMENTS

2012/0187645 A1*   7/2012   Albert .................. B62D 53/068
                                                                  280/81.1
2012/0187656 A1*   7/2012   Albert .................. B62D 53/068
                                                                  280/405.1
2018/0186208 A1    7/2018   Coombs

FOREIGN PATENT DOCUMENTS

EP           3045339 A1 *   7/2016
FR           2948621 A1     2/2011
(Continued)

OTHER PUBLICATIONS

ISO, "International Standard ISO 8855: Road vehicles—Vehicle dynamics and road-holding ability—Vocabulary," Second Edition, Dec. 2011, International Organization for Standardization, 50 pages.

(Continued)

*Primary Examiner* — Scott A Reinbold

(74) *Attorney, Agent, or Firm* — Withrow & Terranova, PLLC

(57) ABSTRACT

A method for controlling axle load distribution of a heavy-duty vehicle during a maneuver, wherein the heavy-duty vehicle comprises a number of wheel axles and one or more motion support devices arranged to adjust a relative axle load of one or more wheel axles of the number of wheel axles, the method comprising obtaining a vehicle model and a tire model, wherein the vehicle model and the tire model are jointly configured to predict a tire scrubbing force in dependence of a vehicle state comprising a relative axle load distribution during the maneuver, determining a nominal tire scrubbing force for a current relative axle load distribution, determining an improved relative axle load distribution maneuver associated with a reduced tire scrubbing force compared to the nominal tire scrubbing force, and controlling the one or more motion support devices to provide the improved relative axle load distribution during the maneuver.

16 Claims, 6 Drawing Sheets

(52) U.S. Cl.
CPC ..... *B60W 2520/10* (2013.01); *B60W 2520/20*
(2013.01); *B60W 2520/28* (2013.01); *B60W 2520/30* (2013.01); *B60W 2530/20* (2013.01);
*B60W 2555/20* (2020.02); *B60W 2710/125*
(2013.01); *B60W 2710/22* (2013.01)

(58) Field of Classification Search
CPC ......... B60W 2520/28; B60W 2520/30; B60W
2530/20; B60W 2555/20; B60W
2710/125; B60W 2710/22; B60G
2300/0262; B60G 2300/042; B60G
2400/204; B60G 2400/208; B60G
2400/41; B60G 2400/52; B60G 2400/61;
B60G 2400/70; B60G 2400/822; B60G
2400/84; B60G 2401/14; B60G 2401/174;
B60G 17/0152; B60G 17/0165; B60G
17/0162
USPC ........................................................ 701/37
See application file for complete search history.

(56) References Cited

FOREIGN PATENT DOCUMENTS

| | | | |
|---|---|---|---|
| GB | 2518053 | A | 3/2015 |
| WO | 13190570 | A1 | 12/2013 |

OTHER PUBLICATIONS

Pacejka, H., "Tire and Vehicle Dynamics," 2012, Elsevier Ltd., 629 pages.
Winkler, C. et al., "Analysis and testing of the steady-state turning of multiaxle trucks," Proceedings of the Fifth International Symposium on Heavy Vehicles Weights and Dimensions, Mar. 29-Apr. 2, 1998, Maroochydore, Queensland, Australia, ARRB Transport Research Ltd., pp. 135-161.
Extended European Search Report for European Patent Application No. 21208677.1, mailed May 6, 2022, 8 pages.
SAE International, "Surface Vehicle Recommended Practice," SAE J670, Jan. 2008, 73 pages.
Extended European Search Report for European Patent Application No. 22205118.7, mailed Mar. 20, 2023, 8 pages.
Examination Report for European Patent Application No. 22205118.7, mailed Aug. 5, 2025, 4 pages.

* cited by examiner

METHOD FOR CONTROLLING AXLE LOAD DISTRIBUTION OF A VEHICLE

RELATED APPLICATIONS

The present application claims priority to European Patent Application No. 21208677.1, filed on Nov. 17, 2021, and entitled "METHOD FOR CONTROLLING AXLE LOAD DISTRIBUTION OF A VEHICLE," which is incorporated herein by reference in its entirety.

TECHNICAL FIELD

The present disclosure relates to methods and control units for ensuring safe and efficient vehicle motion management of a heavy-duty vehicle. In particular, the present disclosure relates to a method for controlling axle load distribution of a heavy-duty vehicle during a maneuver.

The methods are particularly suitable for trucks and semi-trailers comprising a plurality of vehicle units. The disclosure can, however, also be applied in other types of heavy-duty vehicles, e.g., in construction equipment and mining vehicles.

BACKGROUND

Heavy-duty vehicles, such as trucks and semi-trailer vehicles, are designed to carry heavy loads. The heavily laden vehicles must be able to start from standstill also in uphill conditions, accelerate on various types of road surfaces, and most importantly be able to reduce velocity, i.e., brake, in a controlled and reliable manner at all times. It is also important that the vehicle can be operated in an energy efficient manner without unnecessary component wear. A key property to achieving this functionality is a well-designed set of tires. Thus, much work has gone into developing tires for heavy-duty vehicles, where a well-designed tire provides a combination of high friction and low rolling resistance. A well-designed tire also has a low wear rate, i.e., it is mechanically durable and lasts for a long period of time.

Excessive wheel slip occurs when too much torque is applied to an axle or a wheel compared to the road friction. Excessive wheel slip is undesired since it results in an unpredictable vehicle behavior and also in energy inefficient operation.

According to its Abstract, US 2018/186208 A1 discloses a method for analysing and managing a vehicle load carried by a vehicle. The method comprises determining a set of loading criteria; sampling a set of fluid pressures; determining a first load arrangement based on the set of fluid pressures, wherein the first load arrangement comprises a coordinate mapping; determining a second load arrangement based on the set of loading criteria; determining a loading instruction set based on the second load arrangement and the first load arrangement; and providing the loading instruction set to a user of the vehicle.

However, there is a continuing need for further improvements in vehicle motion management in heavy-duty vehicles.

SUMMARY

It is an object of the present disclosure to provide techniques which alleviate or overcome at least some of the above-mentioned problems and to provide an improved method for controlling axle load distribution of a vehicle during a maneuver. This object is achieved by a method according to claim 1. The objective is also achieved by the other independent claims. The dependent claims are directed to advantageous embodiments of the disclosure.

According to a first aspect, there is provided a method for controlling axle load distribution of a heavy-duty vehicle during a maneuver, wherein said heavy-duty vehicle comprises a number of wheel axles and one or more motion support devices arranged to adjust a relative axle load of one or more wheel axles of the number of wheel axles. The method comprises: obtaining a vehicle model and a tire model, wherein the vehicle model and the tire model are jointly configured to predict a tire scrubbing force in dependence of a vehicle state comprising a relative axle load distribution during the maneuver, determining a nominal tire scrubbing force for a current relative axle load distribution during the maneuver, based on the vehicle model and on the tire model, determining an improved relative axle load distribution for the maneuver associated with a reduced tire scrubbing force compared to the nominal tire scrubbing force, based on the vehicle model and on the tire model, and controlling the one or more motion support devices to provide the improved relative axle load distribution during the maneuver.

Hereby, it becomes possible to provide an improved vehicle motion management system where the axle loads on the vehicle can be dynamically adjusted in order to reduce tire scrubbing force. This is at least partly due to the provisions of determining the axle load distribution for a given maneuver based on a vehicle tire model and a vehicle model.

By modelling tire scrubbing force in dependence of the vehicle state, the vehicle control functions can be configured to improve controllability of the vehicle by determining and adjusting a relative axle load distribution. The proposed method may also generally have a positive impact on the tire lifetime. For instance, the vehicle control can be performed with a target to minimize or at least reduce tire scrubbing. By way of example, the method may comprise the optional step of coordinating one or more motion support devices of the heavy-duty vehicle to reduce tire scrubbing under constraints comprising fulfilment of a motion request.

As described herein, the tire model generally defines a relationship between current or future vehicle motion state and tire scrubbing. This means that the tire model can be seen as a function or mapping between vehicle motion state and tire scrubbing.

The tire model may be parameterized by one or more tire parameters obtained from input data related to at least one parameter of a tire on the heavy-duty vehicle.

The method may further comprise obtaining input data related to the at least one parameter of a tire on the heavy-duty vehicle from one or more sensors arranged to measure one or more operating parameters of the tire. The sensors can be configured to provide real-time data from the tire, thus enabling a real-time dynamic adaptation of the tire model which quickly reacts to changes in tire properties. Thus, if tire properties change, so will the tire model, which is an advantage.

The input data relating to the measured one or more operating parameters may comprise any of: vehicle speed, wheel rotation speed, tire pressure, tire temperature, tire acceleration, tire strain, tire GPS position, weather, ambient temperature, rain classification data, amount of water on road, normal load, slip angle, steer angle, and applied torque on one or more wheels. Thus, the tire model is able to adjust to many different operating parameters which is an advantage.

The input data may comprise data obtained from a memory related to tire design. Different types of tires may have different properties and may react differently to events such as low road friction, high temperatures, rain, and so on. By accounting for the tire design, the model can be made more accurate. The data related to tire design comprises any of: tire nominal dimension, tire structural characteristics, tire chemical composition, tire history.

The one or more estimated tire parameters may comprise any of: tire wear, tire longitudinal stiffness, tire lateral stiffness, tire rolling resistance, tire peak friction, tire rolling radius, tire contact patch properties, tire balance properties and wheel alignment properties. It is an advantage to be able to capture all these different tire parameters by the tire model. Having accurate information about one or more of these parameters facilitates efficient and/or safe vehicle control.

The method may comprise repeatedly updating at least part of the one or more tire parameters based on updated input data. Thus, the tire model is kept up to date, despite changes in, e.g., operating conditions and tire state.

The method may further comprise determining the improved relative axle load distribution for the maneuver based on a desired effective wheelbase of the heavy-duty vehicle during the maneuver. By not only accounting for the tire scrubbing force when determining the improved relative axle load distribution, an even more advanced vehicle motion management may be enabled. By modelling the tire model in dependence of the tire scrubbing force and further determining the improved relative axle load distribution for the maneuver based on the desired effective wheelbase, the vehicle control can be improved also with respect to desired effective wheelbase, which is an additional advantage. In this context, the desired effective wheelbase is associated an improved maneuverability.

Thus, according to one example, the provision of determining an improved relative axle load distribution for the maneuver associated with a reduced tire scrubbing force compared to the nominal tire scrubbing force further comprises determining an improved relative axle load distribution for the maneuver associated with a desired effective wheelbase of the heavy-duty vehicle during the maneuver. As such, the provision of determining an improved relative axle load distribution for the maneuver associated with a reduced tire scrubbing force compared to the nominal tire scrubbing force, based on the vehicle model and on the tire model, further comprises determining an improved relative axle load distribution for the maneuver associated with a reduced tire scrubbing force compared to the nominal tire scrubbing force, and further associated with a desired effective wheelbase of the heavy-duty vehicle during the maneuver.

In this example, the determined improved relative axle load distribution may be determined by applying a cost function to identify a relative axle load distribution favorable both for reducing tire scrubbing force and improving maneuverability. The cost function may as an example evaluate possible relative axle load distribution configurations for different effective wheelbases and tire scrubbing forces.

Moreover, the determined improved relative axle load distribution may correspond to a relative axle load distribution minimizing the cost function.

For instance, a control strategy for completing a maneuver associated with reduced effective wheelbase can be chosen over one which is associated with increased effective wheelbase. Consequently, the method may also comprise coordinating one or more motion support devices of the heavy-duty vehicle to adjust the effective wheelbase under constraints comprising fulfilment of a motion request. According to other examples, the method may further comprise coordinating one or more motion support devices of the heavy-duty vehicle to adjust the effective wheelbase of the heavy-duty vehicle.

The method may further comprise coordinating a rear axle steering strategy together with a change of the equivalent wheelbase.

By way of example, the provision of determining the improved relative axle load distribution for the maneuver based on a desired effective wheelbase of the heavy-duty vehicle during the maneuver further comprises solving an optimization problem. The optimization problem may generally be defined by a cost function.

It should be noted that there is generally a progressive relationship between tire scrub and maneuverability. For example, the maneuverability may partially increase by decreasing the effective wheelbase.

The method may further comprise determining a first improved relative axle load distribution for the maneuver associated with a reduced tire scrubbing force compared to the nominal tire scrubbing force and determining a second improved relative axle load distribution based on the desired effective wheelbase of the heavy-duty vehicle during the maneuver, and further selecting one of the first and second improved relative axle load distributions as the improved relative axle load distribution.

The method may further comprise coordinating the one or more motion support devices of the heavy-duty vehicle on the basis of the improved relative axle load distribution.

Hereby, the one or more motion support devices of the heavy-duty vehicle are coordinated to reduce the tire scrubbing under constraints comprising fulfilment of a motion request.

By way of example, the provision of determining the current axle load distribution comprises determining an instant vertical load on each one of the wheels.

The method may further comprise determining a tire scrubbing level of at least one tire of the vehicle on the basis of the tire model and the vehicle model.

The method may further comprise determining a wheel slip limit for the vehicle motion control in dependence of a pre-determined acceptable target tire scrubbing.

By way of example, the provision of controlling the one or more motion support devices to provide the improved relative axle load distribution during the maneuver comprises any one of adjusting vertical load on each one of the wheels, adjusting load on a single axle and adjusting load distribution between different axles. According to one example embodiment, the method may thus comprise controlling the one or more motion support devices to provide the improved relative axle load distribution during the maneuver comprising adjusting load distribution between different types of axles.

By way of example, the provision of controlling the one or more motion support devices to provide the improved relative axle load distribution during the maneuver comprising adjusting load distribution between non-steered and steered axles.

The method may further comprise coordinating one or more motion support devices of the heavy-duty vehicle to adjust a liftable axle. In general, the method here further comprises the step of determining if a liftable axle is to be lifted or not so as to provide the improved relative axle load distribution.

The method may further comprise coordinating one or more motion support devices of the heavy-duty vehicle to adjust the active suspension systems. As such, the method may further comprise coordinating one or more motion support devices of the heavy-duty vehicle to provide the improved relative axle load distribution during the maneuver by adjusting the active suspension systems.

The method may further comprise coordinating the one or more motion support devices of the heavy-duty vehicle to engage an inter-axle differential locks between driven axles of the vehicle. As such, the method may further comprise coordinating one or more motion support devices of the heavy-duty vehicle to provide the improved relative axle load distribution during the maneuver by engaging an inter-axle differential lock between driven axles of the vehicle.

By way of example, the one or more motion support devices may be coordinated to engage an inter-axle differential lock between a driven pair of wheel axles of a boogie device of the vehicle.

The method may further comprise coordinating one or more motion support devices of the heavy-duty vehicle to increase a steering angle(s) of a steered axle compared to kinematic steering. In this manner, it becomes possible to improve maneuverability of the vehicle at the cost of increased tire scrub and thus increased energy consumption.

The method may further comprise obtaining route information and controlling the one or more motion support devices to provide the improved relative axle load distribution during the maneuver ahead of any detected upcoming path curvature.

The method may further comprise comparing the determined improved relative axle load distribution with one or more prevailing axle load limitations. The prevailing axle load limitations can be determined by using road sign recognition and vehicle position with geographical map data.

The method may further comprise controlling motion of the heavy-duty vehicle based on the tire model and on the determined vehicle motion state.

By way of example, the provision of obtaining a vehicle model comprises determining a vehicle motion state.

In addition, the provision of determining the vehicle motion state may comprise determining any one of vehicle linear speed, vehicle angular speed, vehicle linear acceleration, vehicle angular acceleration, wheel rotation speed, tire acceleration, tire normal load, slip angle, and steer angle. The vehicle model may also contain a value of the applied torque on one or more wheels.

Typically, the provision of determining the vehicle motion state may comprise determining any one of longitudinal wheel slip of a respective wheel of the tire, lateral wheel slip of the respective wheel of the tire, a normal load of the respective wheel of the tire, an acceleration of the respective wheel of the tire, and a rotational velocity of the respective wheel of the tire.

The tire model may also be configured to model a self-aligning torque of the tire. It is an advantage to have a good understanding of the self-aligning torque properties of a tire, since this may simplify vehicle control by removing some behavioral uncertainties which otherwise may lead to control inaccuracy.

There is also disclosed herein control units, computer programs, computer readable media, computer program products, and vehicles associated with the above discussed advantages.

According to a second aspect, there is provided a computer program comprising program code means for performing any one of the steps, provision and/or embodiments of the first aspect when said program is run on a computer or on processing circuitry of a control unit.

According to a third aspect, there is provided a computer readable medium carrying a computer program comprising program code means for performing any one of the steps, provision and/or embodiments of the first aspect when said program product is run on a computer or on processing circuitry of a control unit.

According to a fourth aspect, there is provided a control unit for controlling axle load distribution of a heavy-duty vehicle during a maneuver, the control unit being configured to perform any one of the steps, provision and/or embodiments of the first aspect.

Further effects and features of the second, third and fourth aspects are largely analogous to those described above in relation to the first aspect.

According to a fifth aspect, there is provided a vehicle comprising a control unit according to the fourth aspect.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION

Figure 1:
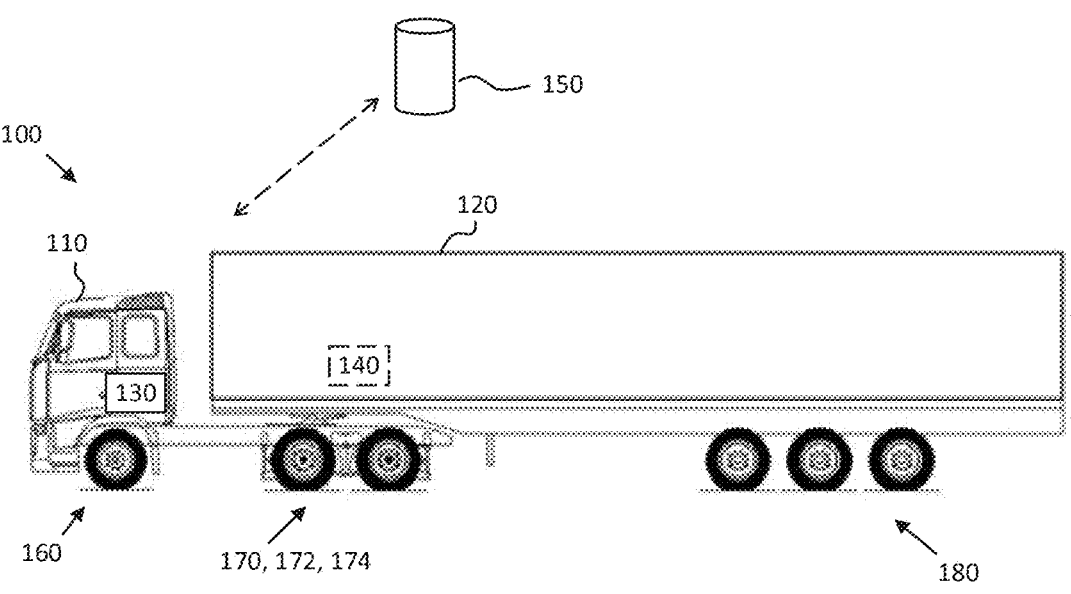
FIG. 1 schematically illustrates a vehicle for cargo transport.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIG. 1 illustrates a heavy-duty vehicle 100. This particular example comprises a tractor unit 110 which is arranged to tow a trailer unit 120. The tractor 110 comprises a vehicle control unit (VCU) 130 arranged to control various functions of the vehicle 100. For instance, the VCU may be arranged to perform a vehicle motion management (VMM) function comprising control of relative axle load distribution, tire scrubbing force, effective wheelbase, wheel slip, vehicle unit stability, and so on. The vehicle motion management (VMM) function may sometimes also be denoted as a control allocation function.

The trailer unit 120 optionally also comprises a VCU 140, which then controls one or more functions on the trailer 120. The VCU or VCUs may be communicatively coupled, e.g., via wireless link, to a remote server 150. This remote server may be arranged to perform various configurations of the ECU, and to provide various forms of data to the ECU 130, such as providing data regarding the make and type of tires mounted on the vehicle 100, as will be discussed in more detail below.

The vehicle combination 100 may of course also comprise additional vehicle units, such as one or more dolly units and more than one trailer unit.

The vehicle 100 is supported by wheels, where each wheel comprises a tire. The vehicle comprises multiple axles, including a front axle and a number of rear axles 172. The tractor unit 110 has front wheels 160 which are normally steered, and rear wheels 170 of which at least one pair are driven wheels. Generally, the rear wheels of the tractor 110 may be mounted on tag or pusher axles. A tag axle is where the rear-most drive axle is non-powered, also referred to as a free-rolling or dead axle. A pusher axle is where the forward-most drive axle is not powered. The trailer unit 120 is supported on trailer wheels 180. Trailers with driven wheels, and even a steered axle, are also possible.

One or more of the rear axles 172 are here also non-steering rear axles. Further, one or more of the rear axles and/or one of the axles on the trailer 120 are here a liftable axle 172. A lift axle, also known as a retractable axle, is an axle which can be raised so that its tires are not touching the road surface. This improves fuel economy and reduces maintenance and tire wear. It may also reduce or increase dynamic stability features of the vehicle and it can increase or decrease road wear depending on vehicle load, which axles that are lifted and in which driving situation the axle is lifted.

One or more of the wheels may also be mounted with an active suspension which may be controlled by the VCU 130, 140, e.g., in order to adjust a normal force of one or more tires. Accordingly, the heavy-duty vehicle comprises an active suspension system 174. Current axle load distribution is measured with one or more pressure sensors installed in each axle suspension of the active suspension system 174. In this manner, it is possible to control the axle load distribution. Such control and measurements are integral parts of an electronic air suspension control, which herein may be referred to as "active suspension control". The active suspension control is further an integrated part of the active suspension system. The active suspension system is a commonly known part of the vehicle, and thus not further described herein.

The tires on the wheel play a role in determining the behavior and capabilities of the vehicle 100. A well-designed set of tires will provide both good traction and fuel economy, while a poorly designed set of tires, or overly worn tires, are likely to reduce both traction and fuel economy and may even result in an unstable vehicle combination, which of course is undesired.

The present disclosure at least partly relates to software tire models which model tire parameters and tire behaviors, e.g., for a given vehicle state such as a vehicle velocity, normal load, and so on. The tire models can be used with advantage by the VCU to optimize control of the vehicle 100. For example, the tire models disclosed herein may be used to model a relationship between tire scrubbing and vehicle motion state to better control the relative axle load distribution. By way of example, the tire model is used to determine an improved relative axle load distribution for the maneuver associated with the reduced tire scrubbing force compared to a nominal tire scrubbing force.

In other examples, the tire models disclosed herein may be used to model a relationship between generated wheel force and wheel slip, which relationship then allows the VCU to better control the vehicle by requesting a wheel slip from a torque generating device instead of a direct request for torque. The torque generating device is then able to maintain a much more stable generated wheel force due to a higher bandwidth control loop run locally, i.e., closer to the wheel end.

Some example tire models may also be used to estimate a tire wear rate in dependence of a vehicle state, i.e., if a certain vehicle maneuver or operation results in excessive tire wear or not. Further example tire models discussed herein model tire rolling resistance, such that the VCU can optimize vehicle control to reduce tire rolling resistance and thus obtain an increased energy efficiency for a given transport mission or just for a single maneuver.

The tire models discussed herein are configured to be dynamically updated as the vehicle is operated. Thus, preferably, the tire models are dynamic and not static, which means that the tire models will be able to better and more closely model tire parameters in dependence of, e.g., the overall driving scenario and the state of the tires over time as the tire characteristics change due to wear and variation in inflation pressure and temperature.

Some important properties and characteristic parameters of a tire will now be discussed. These tire parameters are optionally comprised in the tire model, either as tire parameters from which other capabilities and characteristics of the tire can be determined by the VCU 130, 140, or simply as tire characteristics which can be used more or less directly by the VCU 130, 140 to optimize various control decisions.

A tire rotating at higher speeds tends to develop a larger diameter, i.e., a larger rolling radius, due to centrifugal forces that force the tread rubber away from the axis of rotation. This effect is often referred to as centrifugal growth. As the tire diameter grows, the tire width decreases. Excessive centrifugal growth may significantly impact the behavior of a tire.

The pneumatic trail of a tire is the trail-like effect generated by resilient material tires rolling on a hard surface and subject to side loads, as in a turn. The pneumatic trail parameter of a tire describes the distance where the resultant force of a tire sideslip occurs behind the geometric centre of the contact patch of the tire.

Tire scrub, as used herein, generally relates to the act of having a tire heavily wearing against the road surface due high lateral loading at low speeds. The tire scrub is discussed in Winkler, C. B. and Aurell, J. Analysis and testing of the steady-state turning of multiaxle trucks. Proceedings. Fifth International Symposium on Heavy Vehicles Weights and Dimensions, ARRB Transport Research Ltd., Maroochydore, Queensland, Australia, Mar. 29-Apr. 2, 1998, part 2, pp. 135-161. In brief, tire scrub is in particular present for vehicles having multiple, non-steering rear axles and dual tires where substantial tire slip angles are developed as a direct result of path curvature, even when traveling at very low speeds, i.e., at near-zero lateral acceleration. Hence, the substantial slip angle on the non-steered axles origins from pure geometry of the vehicle motion along a curved path. The parameter tire scrub force may further be described in relation to the FIG. 9, which depicts a situation where a vehicle with two non-steered rear axles drives along a path with a high curvature.

Figure 9:
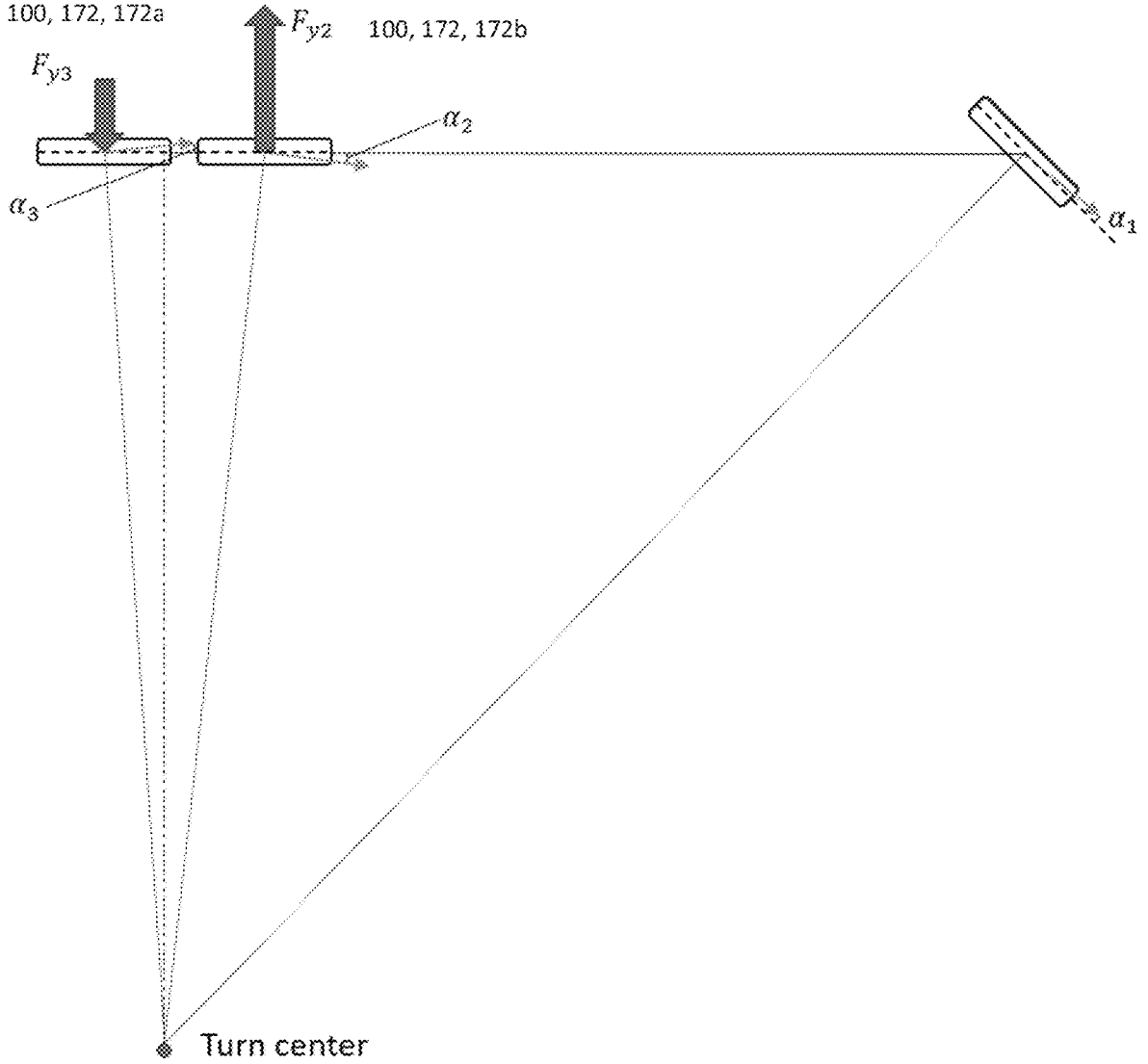
FIG. 9 shows an example of a vehicle with two non-steered rear axles driving along a high curvature path, and further depicted using a single-track vehicle model.

As illustrated in FIG. 9, the turning centre projects between the two rear axles 172, 172a, 172b that leads to a positive slip angle on the third axle and a negative slip angle on the second axle. The slip angle is denoted with a in FIG. 9. In FIG. 9, there is illustrated three different slip angle $\alpha$, i.e., $\alpha 1$, $\alpha 2$ and $\alpha 3$.

The slip angle $\alpha$ results into a lateral force produced by the tire. Therefore, the two rear axles 172a, 172b produce lateral forces of opposite sign, FY3 and FY2 in FIG. 9, which causes the tires to scrub, as the lateral forces fight each other. The balance of the lateral force's changes depending on the situation and is generally affected by the axle loads, tire properties and maneuver (such as the vehicle speed and path curvature).

Slip angle or sideslip angle, denoted with a herein, is a standardized term defined in accordance with ISO8855: 2011, section 5.2.12, "ISO8855 Road Vehicles—Vehicle dynamics and road-holding ability". The slip angle is the angle between a rolling wheel's direction towards which it is pointing and the actual direction of travel, i.e., the angle of the vector sum of the wheel translational velocity.

The relaxation length of a tire is a property of a pneumatic tire that describes the delay between when a slip angle is introduced and when the cornering force reaches its steady state value. Normally, relaxation length is defined as the rolling distance needed by the tire to reach 63% of the steady state lateral force, although other definitions are also possible.

Vertical stiffness, or spring rate, is the ratio of vertical force to vertical deflection of the tire, and it contributes to the overall suspension performance of the vehicle. In general, spring rate increases with inflation pressure.

The contact patch, or footprint, of the tire, is the area of the tread that is in contact with the road surface. This area transmits forces between the tire and the road via friction.

The length-to-width ratio of the contact patch affects steering and cornering behavior. The tire tread and sidewall elements undergo deformation and recovery as they enter and exit the footprint. Since the rubber is elastomeric, it is deformed during this cycle. As the rubber deforms and recovers, it imparts cyclical forces into the vehicle. These variations are collectively referred to as tire uniformity. Tire uniformity is characterized by radial force variation (RFV), lateral force variation (LFV) and tangential force variation. Radial and lateral force variation is measured on a force variation machine at the end of the manufacturing process. Tires outside the specified limits for RFV and LFV are rejected. Geometric parameters, including radial runout, lateral runout, and sidewall bulge, are measured using a tire uniformity machine at the tire factory at the end of the manufacturing process as a quality check.

The cornering force or side force of a tire is the lateral (i.e., parallel to the road surface) force produced by a vehicle tire during cornering.

Rolling resistance is the resistance to rolling caused by deformation of the tire in contact with the road surface. As the tire rolls, tread enters the contact area and is deformed flat to conform to the roadway. The energy required to make the deformation depends on the inflation pressure, rotating speed, and numerous physical properties of the tire structure, such as spring force and stiffness. Tire makers often seek lower rolling resistance tire constructions to improve fuel economy in trucks, where rolling resistance accounts for a high proportion of fuel consumption.

Ride comfort relates to the general experience of the driver or a passenger when riding in a vehicle. The ride comfort is dependent on the behavior of the vehicle, which in turn depends on the properties of the tires.

Self-aligning torque (SAT) is the torque that a tire creates as it rolls along that tends to steer it, i.e., rotate it around its vertical axis.

A tire model can be used to describe the properties of a given tire, such as those above and also other properties. For instance, a tire model can be used to define a relationship between longitudinal tire force Fx for a given wheel and an equivalent longitudinal wheel slip for the wheel. Longitudinal wheel slip $\lambda_x$ relates to a difference between wheel rotational velocity and speed over ground and will be discussed in more detail below. Wheel rotation speed co is a rotational speed of the wheel, given in units of, e.g., rotations per minute (rpm) or angular velocity in terms radians/second (rad/sec) or degrees/second (deg/sec). The wheel behavior in terms of wheel force generated in longitudinal direction (in the rolling direction) and/or lateral direction (orthogonal to the longitudinal direction) as function of wheel slip is discussed in "Tire and vehicle dynamics", Elsevier Ltd. 2012, ISBN 978-0-08-097016-5, by Hans Pacejka. See, e.g., chapter 7 where the relationship between wheel slip and longitudinal force is discussed.

Longitudinal wheel slip $\lambda_x$ may, in accordance with SAE J670 (SAE Vehicle Dynamics Standards Committee Jan. 24, 2008) be defined as $$\lambda_x = \frac{R\omega - v_x}{\max(|R\omega|, |v_x|)}$$

where R is an effective wheel radius in meters, $\omega_x$ is the angular velocity of the wheel, and $v_x$ is the longitudinal speed of the wheel (in the coordinate system of the wheel).

Thus, $\lambda_x$ is bounded between $-1$ and $1$ and quantifies how much the wheel is slipping with respect to the road surface.

Wheel slip is, in essence, a speed difference measured between the wheel and the vehicle. Thus, the herein disclosed techniques can be adapted for use with any type of wheel slip definition. It is also appreciated that a wheel slip value is equivalent to a wheel speed value given a velocity of the wheel over the surface, in the coordinate system of the wheel.

The sideslip angle or slip angle of a tire is the angle between the direction it is moving and the direction it is pointing. Lateral slip can occur, for instance, in cornering, and is enabled by deformation in the tire structure and tread. Despite the name, no actual sliding is necessary for small slip angles. The slip angle is normally defined as $$\alpha = \arctan\left(\frac{v_y}{|v_x|}\right)$$

where $v_x$ is a longitudinal velocity component of the wheel motion, and $v_y$ is a lateral velocity component of the wheel motion. Lateral tire slip is also discussed in detail in, e.g., "Tire and vehicle dynamics", Elsevier Ltd. 2012, ISBN 978-0-08-097016-5, by Hans Pacejka.

Lateral wheel slip $\lambda_y$ can optionally also be defined as $$\lambda_y = \frac{v_y}{\max(|R\omega|, |v_x|)}$$

where $v_y$ is the lateral speed of the wheel (in the coordinate system of the wheel), measured on a direction orthogonal to the direction of the longitudinal speed $v_x$.

Figure 2:
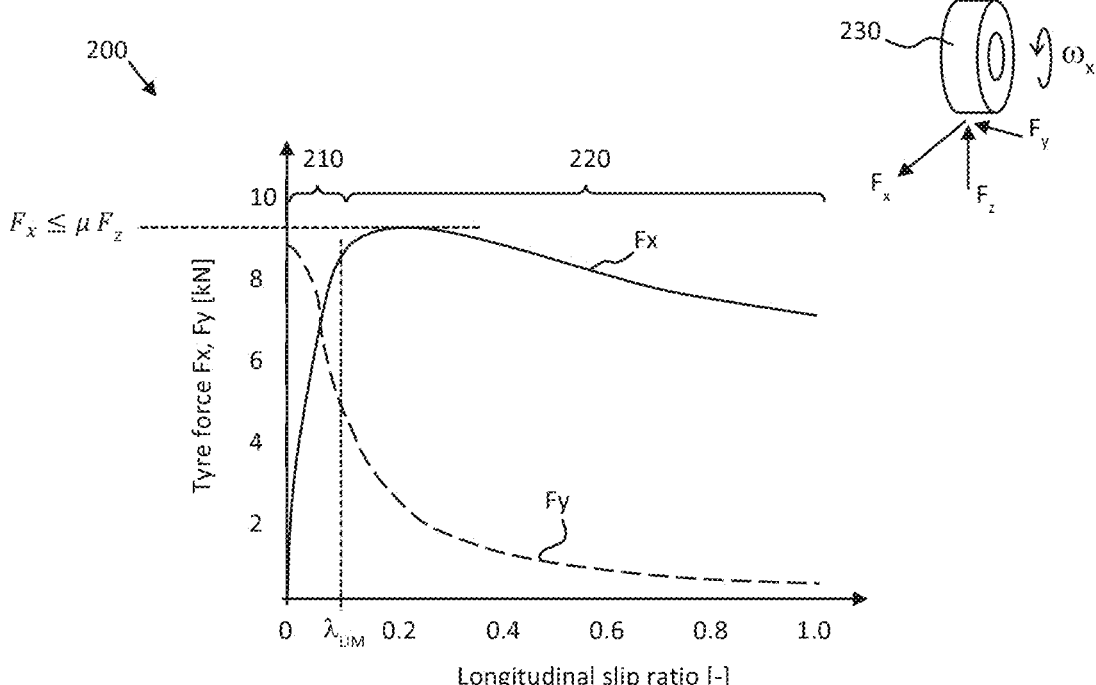
FIG. 2 is a graph showing an example of a tire model.

In order for a wheel (or tire) to produce a wheel force, slip must occur. For smaller slip values the relationship between slip and generated force are approximately linear, where the proportionality constant is often denoted as the slip stiffness of the tire. With reference to FIG. 2, a tire 230 (such as any of the tires 160, 170, 180) is subject to a longitudinal force $F_x$, a lateral force $F_y$, and a normal force $F_z$. The normal force $F_z$ is key to determining some important vehicle properties. For instance, the normal force to a large extent determines the achievable longitudinal tire force $F_x$ by the wheel since, normally, $F_x \leq \mu F_z$, where $\mu$ is a friction coefficient associated with a road friction condition. The maximum available lateral force for a given lateral slip can be described by the so-called Magic Formula as described in "Tire and vehicle dynamics", Elsevier Ltd. 2012, ISBN 978-0-08-097016-5, by Hans Pacejka.

FIG. 2 shows a graph 200 illustrating an example of achievable tire forces $F_x$, $F_y$ as function of wheel slip. The longitudinal tire force Fx shows an almost linearly increasing part 210 for small wheel slips, followed by a part 220 with more non-linear behavior for larger wheel slips. The obtainable lateral tire force Fy decreases rapidly even at relatively small longitudinal wheel slips. It is desirable to maintain vehicle operation in the linear region 210, where the obtainable longitudinal force in response to an applied brake command is easier to predict, and where enough lateral tire force can be generated if needed. To ensure operation in this region, a wheel slip limit $\lambda_{LIM}$ on the order of, e.g., 0.1, can be imposed on a given wheel. For larger wheel slips, e.g., exceeding 0.1, a more non-linear region 220 is seen.

The wheel forces can in the linear region be described by a stiffness both for longitudinal and lateral tire force, as $$F_x = C_x(w, F_z)\lambda_x$$

$$F_y = C_y(w, F_z)\alpha$$

where w is a parameter indicating tire wear, a is a slip angle of the tire, and where $C_x$ and $C_y$ are stiffness functions. The tire stiffnesses $C_x$ and $C_y$ normally increase with wear w and normal force $F_z$. Both functions above represent tire models which depend on tire parameters and vehicle state properties. Given a tire model such as the function $C_x(\cdot)\lambda_x$ and/or the function $C_y(\cdot)\alpha$ and input data related to the tire parameters w, $F_z$, it is possible for a VCU to obtain an accurate relationship between generated wheel force and wheel slip. This relationship will change in dependence of the tire parameters, i.e., the relationship will be a dynamic relationship which is updated over time as the tire wears and as the normal force $F_z$ of the tire changes.

A tire model of this kind can be determined by practical experimentation, analytical derivation, computer simulation, or a combination of the above. In practice, the tire model may be represented by a look-up table (LUT) indexed by the tire parameters, or as a set of coefficients describing a polynomial or the like. There the set of coefficients are selected based on the tire parameters, and where the polynomial then describes the relationship between tire behavior and vehicle state.

Figures 3, 4:
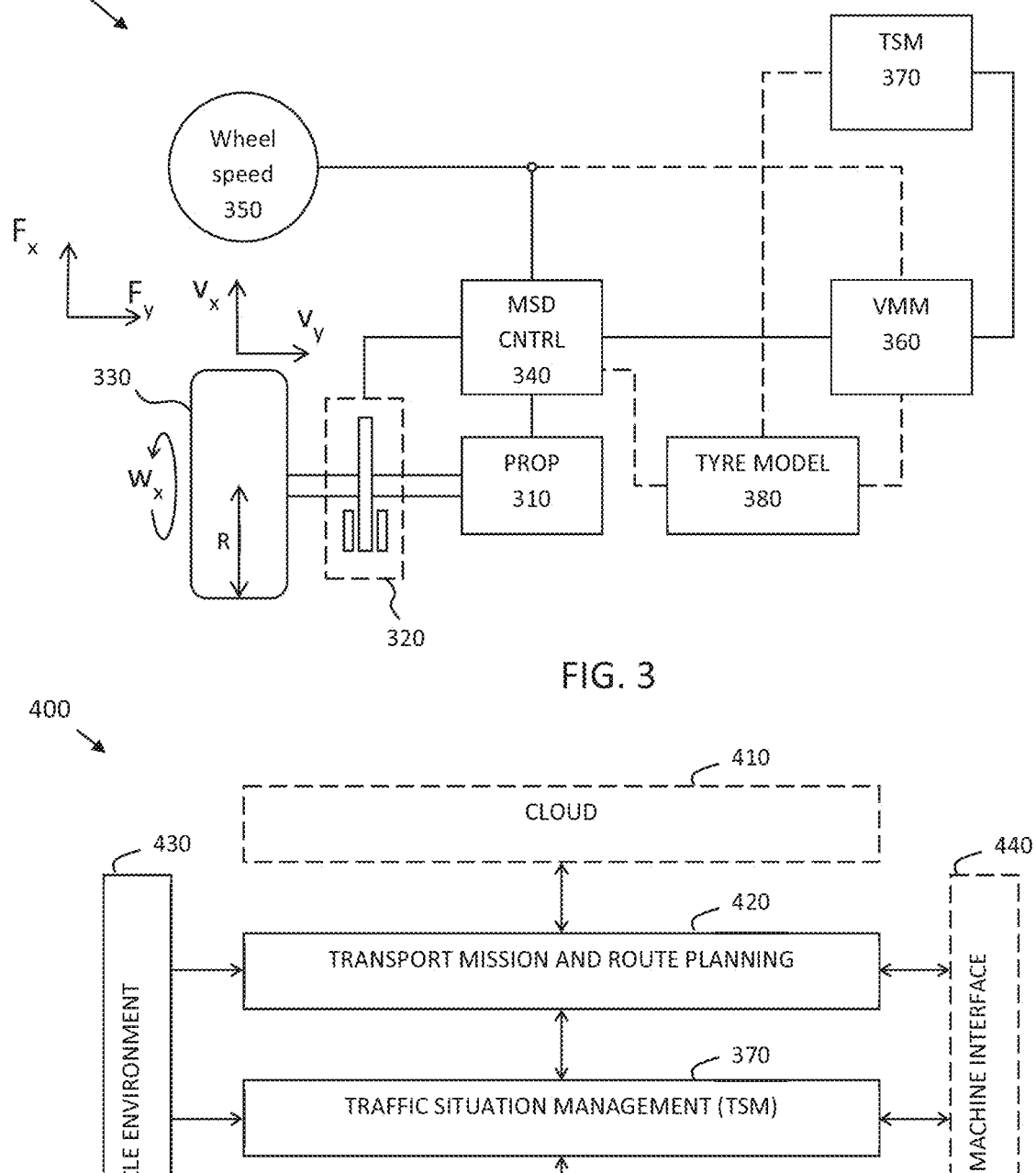
FIG. 3 is a block diagram illustrating motion support device control.
FIG. 4 shows a control architecture for controlling a vehicle.

FIG. 3 schematically illustrates functionality 300 for controlling a wheel 330 by some example MSDs here comprising a friction brake 320 (such as a disc brake or a drum brake) and a propulsion device 310 (such as an electric machine or a combustion engine). The friction brake 320 and the propulsion device 310 are examples of wheel torque generating devices, which may also be referred to as actuators and which can be controlled by one or more motion support device control units 340. The control is based on, e.g., measurement data obtained from a wheel rotation speed sensor 350 and from other vehicle state sensors, such as radar sensors, lidar sensors, and also vision based sensors such as camera sensors and infra-red detectors. Other example torque generating motion support devices which may be controlled according to the principles discussed herein comprise engine retarders and power steering devices. An MSD control unit 340 may be arranged to control one or more actuators. For instance, it is not uncommon that an MSD control unit is arranged to control MSDs for both wheels of an axle. By estimating vehicle unit motion using, e.g., global positioning systems, vision-based sensors, wheel rotation speed sensors, radar sensors and/or lidar sensors, and translating this vehicle unit motion into a local coordinate system of a given wheel (in terms of, e.g., longitudinal and lateral velocity components), it becomes possible to accurately estimate wheel slip in real time by comparing the vehicle unit motion in the wheel reference coordinate system to data obtained from the wheel rotation speed sensor 350 arranged in connection to the wheel.

Both the friction brake 320 and the propulsion device interacts with the road surface via a wheel 330 comprising a tire. Thus, the tire properties and behavioral characteristics has an impact on how the different control actions by the friction brake 320 and the propulsion device 310 generate vehicle motion. A software-based tire model 380 is comprised in the system. This tire model provides information about the tire currently mounted on the wheel 330, its properties, and behavioral characteristics. The VMM 360 and/or the MSD control unit 340 uses the information provided by the tire model to predict consequences of different control allocations. This means that the VMM and/or the MSD control unit can optimize control actions in dependence of the particular characteristics and properties of the tire.

According to a first example, the VMM 360 uses input from the tire model in order to predict a nominal tire scrubbing force as a function of vehicle motion state. The prediction function, i.e., the mapping between slip and force is determined by the current tire parameters such as tire slip stiffness properties, tire thread area temperature, tire nominal inflation pressure, current tire normal force, wheel rotation speed, tire wear, and road friction coefficient. The vehicle state or vehicle motion state generally comprises a value of a relative axle load distribution between the axles. As such, the VMM 360 is configured to determine a nominal tire scrubbing force for a current relative axle load distribution. Then, by way of example, the tire model is used to determine an improved relative axle load distribution for the maneuver associated with a reduced tire scrubbing force compared to the nominal tire scrubbing force. This allows the VMM function 360 to choose between different control options and vehicle configurations which all fulfil a desired global force generation, but which may be associated with significant differences in tire scrubbing force. Thus, the VMM function may, e.g., decide that it is beneficial in terms of both rolling resistance and tire wear rate a liftable axle is raised from the ground in a given driving scenario.

According to a second example, the VMM 360 uses input from the tire model in order to predict a generated wheel force as a function of wheel slip. The prediction function, i.e., the mapping between slip and force is determined by the current tire parameters such as tire slip stiffness properties, tire thread area temperature, tire nominal inflation pressure, current tire normal force, wheel rotation speed, tire wear, and road friction coefficient.

According to a third example, the tire model is configured to predict a tire wear rate of the tire in g/km or g/s for an upcoming maneuver, where again the mapping between tire wear rate and vehicle state is determined by the current tire parameters. This allows the VMM function 360 to choose between different control options which all fulfil a desired global force generation, but which may be associated with significant different in tire wear rate.

According to a fourth example, the tire model is configured to predict a tire rolling resistance of the tire for an upcoming maneuver, vehicle state and vehicle configuration. This allows the VMM function 360 to choose between different control options and vehicle configurations which all fulfil a desired global force generation, but which may be associated with significant differences in tire rolling resistance. Thus, the VMM function may, e.g., decide that it is beneficial in terms of both rolling resistance and tire wear rate if a liftable axle is raised from the ground in a given driving scenario.

According to a fifth example, the tire model is configured to predict a ride comfort metric of the vehicle for an upcoming maneuver, based on the response and behavior of the tires during the maneuver, as predicted by the tire model. This again allows the VMM function 360 to choose between different control options and strategies for completing the maneuver in a safe and efficient manner with a secondary objective which reflects the ride comfort. Thus, the VMM function 360 may control the vehicle to operate at a higher ride comfort level compared to previous vehicles.

The tire model may, as mentioned above, be implemented as a look-up table or other type of function. The tire model is parameterized, i.e., defined, by one or more tire parameters. This means that the function itself varies in dependence of the tire properties. The tire model can be used to model various relationships, as exemplified above, such as a relationship or mapping between wheel slip and generated wheel force, and/or a mapping between tire wear rate and vehicle state such as tire normal load, vehicle speed, and wheel slip. It is appreciated that the present disclosure is not limited to any particular form of tire model structure. Rather, it is appreciated that many different types of mathematical and/or experimentally based functions and mappings can be used as the tire model.

Figure 5:
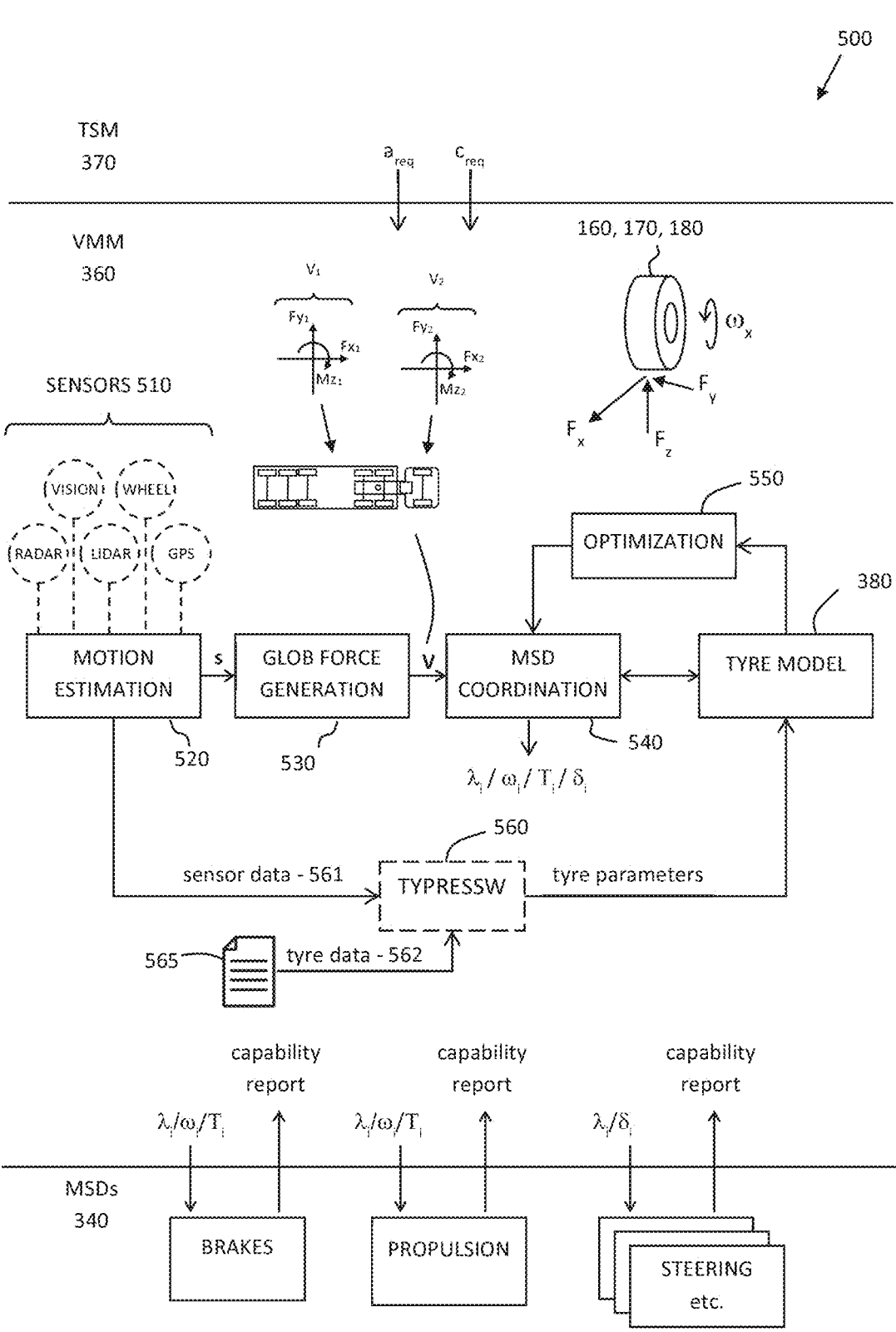
FIG. 5 illustrates an example vehicle motion support device control system.

With reference also to FIG. 4 and FIG. 5, a traffic situation management (TSM) function 370 plans driving operations with a time horizon of, e.g., 1-10 seconds or so. This time frame corresponds to, e.g., the time it takes for the vehicle 100 to negotiate a curve. The vehicle maneuvers, planned and executed by the TSM, can be associated with acceleration profiles and curvature profiles which describe a desired vehicle velocity and turning for a given maneuver. The TSM continuously requests the desired acceleration profiles $a_{req}$ and curvature profiles $c_{req}$ from the VMM function 360 which performs force allocation to meet the requests from the TSM in a safe and robust manner. The TSM function 370 may also base the determination of vehicle maneuver on the tire model 380, as indicated in FIG. 3. For instance, the TSM function 370 may compare two or more different maneuvers which accomplish the same objective in terms of, e.g., tire scrubbing force, tire wear and/or rolling resistance, and then select the one which is most favorable in these respects.

Desired acceleration profiles and curvature profiles may optionally be determined based on input from a driver via a human machine interface 440 of the heavy-duty vehicle via normal control input devices such as a steering wheel, accelerator pedal and brake pedal, although the techniques disclosed herein are just as applicable with autonomous or semi-autonomous vehicles. The exact methods used for determining the acceleration profiles and curvature profiles is not within scope of the present disclosure and will therefore not be discussed in more detail herein. Notably, the traffic situation management and/or the transport mission and route planning function 420 may configure various properties of the vehicle, such as raising and lowering a liftable axle, adjusting suspensions, and so on.

Sensors arranged to provide data about the vehicle environment 430 provides input to the overall control stack 400, and a connection to remote processing resources, such as cloud-based processing resources 410 are also optionally comprised in the control stack. The remote server 150 in FIG. 1 may be comprised in this type of cloud layer 410.

The VMM function 360 operates with a time horizon of about 0,1-1.5 seconds or so, and continuously transforms the acceleration profiles $a_{req}$ and curvature profiles $c_{req}$ into control commands for controlling vehicle motion functions, actuated by the different MSDs of the vehicle 100 which report back capabilities to the VMM, which in turn are used as constraints in the vehicle control. The accuracy of this control is improved by means of the advanced tire models 380 discussed herein.

With reference mainly to FIG. 5, the VMM function 360 performs vehicle state or motion estimation 520, i.e., the VMM function 360 continuously determines a vehicle state s (often a vector variable) comprising positions, speeds, accelerations, yaw motions, normal forces and articulation angles of the different units in the vehicle combination by monitoring vehicle state and behavior using various sensors 510 arranged on the vehicle 100, often but not always in connection with the MSDs.

The result of the motion estimation 520, i.e., the estimated vehicle state s, is input to a global force generation module 530 which determines the required global forces on the vehicle units which need to be generated in order to meet the motion requests from the TSM 370. An MSD coordination function 540 allocates, e.g., wheel forces and coordinates other MSDs such as steering and suspension. The coordinated MSDs then together provide the desired lateral Fy and longitudinal Fx forces on the vehicle units, as well as the required moments Mz, to obtain the desired motion by the vehicle combination 100. As indicated in FIG. 5, the MSD coordination function 540 may output any of wheel slips $\lambda_i$, wheel rotation speeds $\omega$, torques $T_i$ and/or steering angles $\delta$ to the different MSDs.

The MSD coordination function 540 is supported by a tire model function 380 which may continuously update software-based models of the tires on the vehicle. The MSD coordination function 540 may, for instance, use the tire model to determine a relationship between tire scrubbing and vehicle motion state to better control the relative axle load distribution. By way of example, the tire model is used to determine an improved relative axle load distribution for the maneuver associated with the reduced tire scrubbing force compared to a nominal tire scrubbing force. Optionally, the tire model may also be used to determine a relationship between wheel slip and generated wheel force as discussed in connection to FIG. 2. Also, according to another example, the MSD coordination function may decide on a number of different control options and/or different MSD coordination solutions which all meet a current request from the TSM 370, and thereby also improve some secondary objective, like reducing a tire wear rate and/or improving energy efficiency of the transportation mission by reducing a rolling resistance. This selection and/or optimization can be performed by an optimization module 550.

In other words, it is appreciated that there are often additional degrees of freedom available when performing the MSD coordination, meaning that a given set of global forces can often be obtained in many different ways. Each such MSD coordination solution can be evaluated based on the tire model 380, which may then yield a preference towards some particular solution for the present axle load distribution that provides reduced tire scrubbing.

The tire model is parameterized by one or more tire parameters, such as tire wear, tire normal load, tire slip stiffness, etc. These tire parameters may of course be pre-configured. However, additional advantages may be obtained if the tire parameters are estimated or otherwise determined based on tire data obtained from memory 565 or based on tire data obtained from one or more sensors 510. The tire parameters may be estimated or at least regularly updated by a tire parameter estimation software (TYPRESSW) module 560.

Generally, the vehicle control methods disclosed herein and the different example tire models 380 may be based on input signals comprising tire based sensors such as pressure sensors, thread wear sensors, temperature sensors, vibration sensors, rim-based sensors, and the like. The input signals may also comprise data obtained from other sensors arranged on the vehicle 100, such as wheel rotation speed sensors, radar sensors, lidar sensors, vibration sensors, acoustic sensors, and the like. The methods and tire models disclosed herein may also obtain and use information received via wireless link from a remote device, such as the remote server 150, as well as driver requests and various actuator states.

The input to the TYPRESSW module 560, and optionally also to the tire model 380 may comprise wheel speed $v_x$ relative to the road surface, wheel rotation speed $\omega_x$, tire acceleration, tire pressure, tire temperature, tire strain, tire GPS position and weather data, ambient temperature, rain classification (obtained from a rain sensor, and/or from wiper speed, etc.), normal load $F_z$, slip angle $\alpha$ and/or steered angle $\delta$, and applied torque (propulsion and/or braking torque).

Thus, it is understood that a vehicle control unit, such as the VCUs 130, 140 can be arranged to store a tire model 380 in memory, e.g., as a look-up table or mathematical function. The tire model is arranged to be stored in the memory as a function of the current operating condition and parameters of the tire. This means that the tire model can advantageously be adjusted in dependence of the operating condition and general state of the tire, which means that a more accurate model is obtained compared to one which does not account for the particulars of the tire. The model which is stored in memory can be determined analytically or experimentally based on the structural design particulars and chemical composition of the tire which is mounted on the wheel. Also, the control unit can be configured to access a set of different models which are selected depending on the current tire operating condition. One tire model can be tailored for high load driving, where normal forces are large, another tire model can be tailored for slippery road conditions where road friction is low, and so on. The selection of a model to use can be based on a pre-determined set of selection rules.

Thus, the model may be configured to take, e.g., normal force or road friction as input parameters, thereby obtaining the tire model in dependence of a current operating condition of the wheel. It is appreciated that many aspects of the operating conditions can be approximated by default operating condition parameters, while other aspects of the operating conditions can be roughly classified into a smaller number of classes. Thus, obtaining the tire model in dependence of a current operating condition of the wheel does not necessarily mean that a large number of different models need to be stored, or a complicated analytical function which is able to account for variation in operating condition with fine granularity. Rather, it may be enough with two or three different models which are selected depending on operating condition. For instance, one model to be used when the vehicle is heavily loaded and another model to be used otherwise. In all cases, a mapping between tire force and wheel slip changes in some way in dependence of the operating condition, which improves the precision of the mapping.

The tire model may also be implemented at least partly as an adaptive model configured to automatically or at least semi-automatically adapt to the current operating conditions of the vehicle. This can be achieved by constantly monitoring the response of a given wheel in terms of wheel force generated in response to a given wheel slip request, and/or monitoring the response of the vehicle 100 in response to the wheel slip requests. The adaptive model can then be adjusted to more accurately model the wheel forces obtained in response to a given wheel slip request from a wheel.

The outputs from the tire model 380 can optionally be grouped into two categories: current state estimates and model parameters. Current state estimates represent an estimate of instantaneous tire and wheel states. Model Parameters is a group of signals that cover the current estimated tire model 'coefficients', based on a shared common tire model definition. The tire model (or models) may be used by the VCU 130, 140 to predict, e.g., what forces, rolling radius, rolling resistance, and wear rate, that can be expected given the current tire state and vehicle motion characteristics.

The tire model may be adapted to model a large variety of tire parameters independently from each other or in combination, and capabilities in dependence of tire design, tire state, and vehicle motion state:

$[F_{x,stat}, F_{y,stat}]=f1(C_{x0}, C_{y0}, T_{s0}, P_0, F_{z0}, v_{x0}, T_s, P, F_z, v_x, w, \lambda_x, \lambda_y/\alpha, \mu, s_c)$, $[\sigma_x, \sigma_y]=f2(\sigma_{x0}, \sigma_{y0}, T_{s0}, P_0, F_{z0}, v_{x0}, T_s, P, F_z, w, \lambda_x, \lambda_y/\alpha, \mu, s_c)$, $R=f3(R_0, T_{s0}, P_0, F_{z0}, v_{x0}, T_s, P, F_z, v_x, w)$, $M_{rr}=f4(T_{s0}, P_0, F_{z0}, v_{x0}, X_M, T_s, P, F_z, v_x, w, \lambda_x, \lambda_y/\alpha, \mu, s_c)$, $\dot{w}=f5(T_{s0}, P_0, F_{z0}, v_{x0}, X_M, T_s, P, F_z, v_x, w, \lambda_x, \lambda_y/\alpha, \mu, s_c)$, where f1-f5 are functions which may be analytical functions, numerical approximations, or just look-up tables.

In the above equations $F_{x,stat}, F_{y,stat}$ are the calculated steady state forces in long and lateral direction respectively, $\sigma_x, \sigma_y$ are the instant relaxation lengths in longitudinal and lateral direction respectively, $C_{x0}, C_{y0}$ are the longitudinal and lateral slip stiffness of the tire at nominal condition, $\sigma_{x,0}, \sigma_{y,0}$ are the longitudinal and lateral relaxation lengths at nom conditions, $T_{s,0}$ is instant structural tire tread area temperature, $T_s$ is the nominal structural tire tread area temperature, P is the instant inflation pressure, $P_0$ is the nominal inflation pressure, $F_z$ is the instant vertical load, $F_{z,0}$ is the nominal vertical load, $v_x$ is the actual longitudinal speed of the tire (over ground), $v_{x,0}$ is a nominal longitudinal speed, w is the wear (0 to 100%), 0% corresponds to new conditions, $\sigma_x, \sigma_y$ are the instant relaxation lengths in longitudinal and lateral direction respectively, $\lambda_x, \lambda_y$ are the instant slip values, $\mu$ is the instant friction estimate, $s_c$ is and instant discrete state surface condition, R is the calculated instant (free) rolling radius, $R_0$ is the (free) rolling radius under nominal conditions, $M_{rr}$ is the calculated torque from rolling resistance, and $\dot{w}$ is the wear rate of the tire in g/km or g/s.

It is appreciated that the equations can also be re-phrased to depend on different definitions of lateral slip, e.g., $\alpha$ or $\lambda_y$ as discussed above.

Dynamic (instant) forces can also be derived. At least two alternative ways are possible, either relaxing the calculated static forces, or applying the static force formulas on calculated relaxed slip angles ($s_{i,dyn}$), by replacing $\lambda_x, \lambda_y$ in the formulas above with $\lambda_{x-dyn}, \lambda_{y-dyn}$ $$F_{i,dyn} = \frac{1}{\sigma_i} \int (F_{i,stat} - F_{i,dyn}) \cdot v_x dt$$

$$\lambda_{i,dyn} = \frac{1}{\sigma_i} \int (\lambda_i - \lambda_{i,dyn}) \cdot v_x dt$$

where i is either x or y, i.e., longitudinal or lateral direction.

In the following, it will be described how any one of the VMM 360 and the MSD control unit 340 uses the gathered information to solve an optimization problem to predict consequences of different control allocations in order to reduce any one of tire scrubbing force and effective wheelbase.

Typically, any one of the VMM 360 and the MSD control unit 340 is configured to control the one or more motion support devices to provide the improved relative axle load distribution during the maneuver on the basis of the following two variants, which follow different goals.

(i) Adjusting relative axle load distribution to decrease the tire scrubbing force, thus decreasing the associated driving resistance. This may generally lead to decreased energy consumption and decreased tire wear.

(ii) Adjusting relative axle load distribution to decrease the equivalent wheelbase, thus decreasing the turning radius of the vehicle. In this context, it should be noted that a decreased turning radius generally correspond to an improved maneuverability.

In addition, it should be noted that in certain cases, a certain axle load distribution may serve both variants equally well, whilst in some other cases, the axle load distribution may favor one variant and disfavor the other. By associating a virtual cost related to each "energy consumption" and "maneuverability" goals, the control allocation function can decide between the two potentially contradicting load distribution strategies.

Assuming the following optimization problem, which here is a so-called cost function:

$$J^* = \min_u (w_{scrub} * J_{scrub} + w_{manoeuvrability} * J_{manoeuvrability})$$

subject to constraints c wherein, $J_{scrub}$ is the cost function of the total scrub force on the tires, $w_{scrub}$ is the weight factor coefficient for the cost function of the total scrub force on the tires, $J_{manoeuvrability}$ is the cost function of the maneuverability, whilst $J_{manoeuvrability}$ increases with a longer equivalent wheelbase, or in other words, with a larger turning radius, and $w_{manoeuvrability}$ is the weight factor coefficient for the cost function of the maneuverability.

The weight factor coefficients may generally be set based on a given traffic situation and may also be adjusted during operation of the vehicle by any one of the VMM 360 and the MSD control unit 340. With a set of given weight factor coefficients for the $w_{scrub}$ and $w_{manoeuvrability}$, one of the above two cost functions can be prioritized over the other one by any one of the VMM 360 and the MSD control unit 340.

Both $J_{scrub}$ and $J_{manoeuvrability}$ are functions of the herein described different vehicle states, such as steering angle, vehicle speed, etc. In addition, both $J_{scrub}$ and $J_{manoeuvrability}$ use the tire model and the vehicle model to relate vehicle states to the cost of tire scrubbing force and maneuverability.

The constraints c may e.g., include any legal constraints such as maximum axle loads, lateral capabilities, i.e., maximum lateral force that the tires can have for a given condition, or maximum lateral acceleration that the vehicle can have, traction capabilities, etc.

Control allocator function stored in any one of the VMM 360 and the MSD control unit 340 calculates the optimal actuator inputs u which minimizes the given cost function J* above.

Example of optimal actuator inputs u that the control allocator function calculates may e.g., be the axle load distribution, the axle lift requests for liftable axles, the steering angle request for steerable axles, and/or the inter-wheel and inter-axle differential lock requests for drive axles.

To this end, based on the above cost function J*, the control allocator function calculates the required actuator inputs to achieve any one of a desired maneuverability, a desired (reduced) tire scrubbing force. It should be noted, however, that many control actions may favor both achieving the desired maneuverability and the reduced tire scrubbing force, whilst a specific control action may favor one and disfavor the other one.

The term "equivalent wheelbase", as used herein, generally refers to the distance in-between a front axle and a rear axle. By way of example the term equivalent wheelbase refers to the distance in-between a front axle and a rear axle in a 4×2 vehicle. For the vehicles that have more than two axles, equivalent wheelbase can be defined as the distance from the frontmost steered axle to the centre line of the rear axle group. The centre line of the rear axle group, in this context, is defined as the line that is passing through the centre of rotation and that is perpendicular to the longitudinal axis of the vehicle. Further, it should be readily appreciated that vehicles with shorter wheelbase have smaller turning radius for a given steering angle.

Figures 6A, 6B:
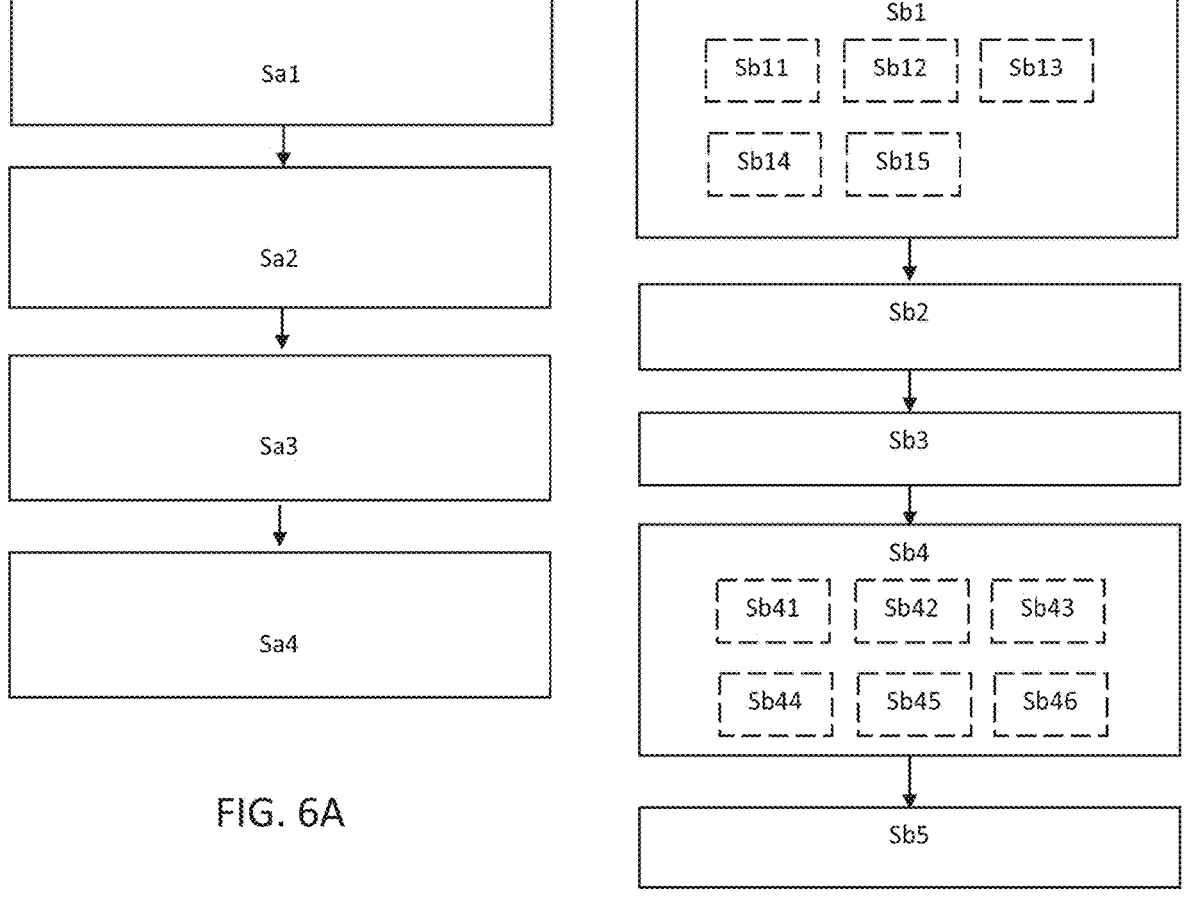
FIGS. 6A-C are flow charts illustrating example methods.
Figure 6C:
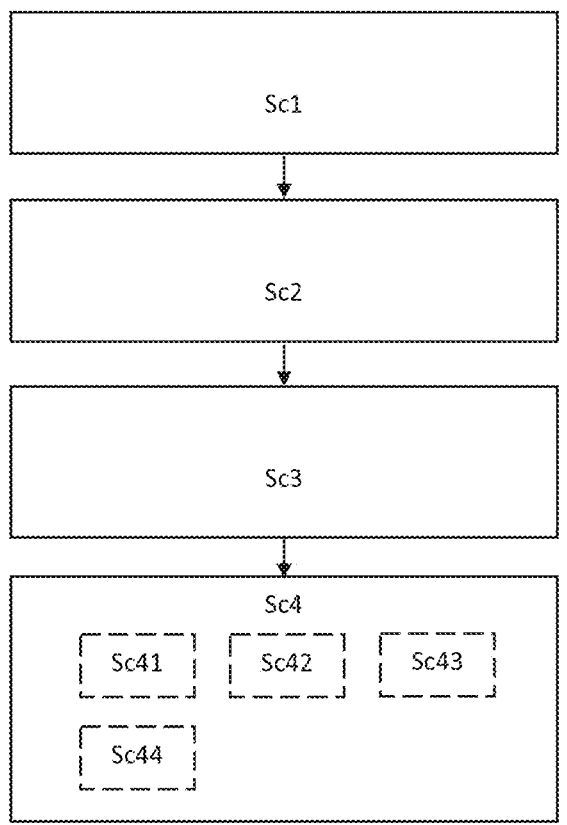

FIGS. 6A-C are flow charts which summarize and exemplify the discussions above. The methods may be performed by the VCU 130, 140 in the vehicle 100, or at least in part by the remote server 150. This VCU may be implemented in a central processing unit or distributed over several units. In addition, the heavy-duty vehicle 100 at least comprises a number of wheel axles and one or more motion support devices arranged to adjust a relative axle load between the wheel axles.

In general, the method comprises obtaining Sa1 a vehicle model and a tire model. The vehicle model and the tire model are jointly configured to predict a tire scrubbing force in dependence of a vehicle state comprising a relative axle load distribution during the maneuver. In this context, jointly configured generally means that the vehicle model and the tire model are configured to cooperate and interact, whilst the vehicle model and the tire model are individually or collectively configured according to any one of the herein disclosed examples of the tire model and vehicle state or motion estimation, e.g., 520 in FIG. 5.

The vehicle state comprising a relative axle load distribution during the maneuver can be determined in several different manners, as mentioned herein. Non-excluding examples are provided in relation to e.g., FIG. 6B.

Further, the method comprises determining Sa2 a nominal tire scrubbing force for a current relative axle load distribution during the maneuver. The nominal tire scrubbing force for the current relative axle load distribution during the maneuver is determined based on the obtained vehicle model and the obtained tire model.

Subsequently, the method comprises determining Sa3 an improved relative axle load distribution for the maneuver associated with a reduced tire scrubbing force compared to the nominal tire scrubbing force, based on the vehicle model and on the tire model.

Then, the method comprises controlling Sa4 the one or more motion support devices to provide the improved relative axle load distribution during the maneuver. The step of controlling Sa4 the one or more motion support devices to provide the improved relative axle load distribution during the maneuver can be performed in several different manners, as mentioned herein. Non-excluding examples are provided in relation to e.g., FIG. 6B.

Turning now to FIG. 6B, there is illustrated an extended version of the method described in relation to FIG. 6A. The method illustrated in FIG. 6B comprises an additional number of further optional steps of the method. Accordingly, with reference also to FIG. 5, FIG. 6B shows a method for controlling axle load distribution of the heavy-duty vehicle 100 during a maneuver.

As mentioned in relation to FIG. 6A, the method illustrated in FIG. 6B also comprises obtaining Sb1 a vehicle model and a tire model, wherein the vehicle model and the tire model are jointly configured to predict a tire scrubbing force in dependence of a vehicle state comprising a relative axle load distribution during the maneuver.

Step Sb1 here comprises obtaining Sb11 input data 561, 562 related to the at least one parameter of a tire 150, 160, 170 on the heavy-duty vehicle 100 from one or more sensors 510 arranged to measure one or more operating parameters of the tire. The input data Sb12 optionally comprises data obtained from the memory 565 related to tire design. The input data may comprise configuration data 562 relating, e.g., to any of tire nominal dimension, tire structural characteristics, tire chemical composition, tire history, or other structural and mechanical characteristics and features of the tire.

Optionally, the data related to tire design also comprises tire history indicating if the tire has been subject to any treatment or events which may have changed the behavior of the tire. For instance, a tire may have been subject to re-treading and/or may have been serviced in a manner which may affect its behavioral characteristics. The input data may furthermore comprise data 561 from one or more sensors 510. The sensors are generally arranged in connection to the actual tire and/or sensors arranged on the vehicle 100. These optional sensors 510 are arranged to measure one or more operating parameters of the tire, where the one or more operating parameters may comprise any of: vehicle speed, wheel rotation speed, tire pressure, tire temperature, tire acceleration, tire strain, tire GPS position, weather, ambient temperature, rain classification data, amount of water on road, normal load, slip angle, steer angle, and applied positive/negative torque on one or more wheels.

The method also comprises determining Sb13 at least part of the one or more tire parameters based on the input data. Some of the parameters may be directly determined. For instance, a nominal tire pressure may be directly given from a pressure sensor arranged to measure tire pressure. Other parameters of the tire may be estimated based on the input data. For instance, an effective tire rolling radius may be determined from a combination of nominal tire dimension, tire pressure and tire rotational speed. Tire wear may be estimated by integrating an estimated tire wear rate, or simply based on tire age. The one or more estimated tire parameters optionally comprise any of: tire wear, tire longitudinal stiffness, tire lateral stiffness, tire rolling resistance, tire peak friction, tire rolling radius, tire contact patch properties, tire balance properties and wheel alignment properties.

The method also comprises configuring Sb14 a tire model. The tire model defines a relationship between tire scrubbing and vehicle motion state. The tire model is parameterized by the one or more tire parameters. That is, the tire model is parameterized by one or more tire parameters obtained from input data 561, 562 related to at least one parameter of a tire 150, 160, 170 on the heavy-duty vehicle 100. As such, the tire model is configured to predict a tire scrubbing force in dependence of a vehicle state comprising a relative axle load distribution during the maneuver.

Thus, given a certain tire model structure, the tire model is first adjusted to fit a given tire mounted to the vehicle, i.e., it is parameterized. It is appreciated that different tires on a vehicle are likely to be associated with different tire model parameterizations, even if the tires fitted to the different wheels of the vehicle are of the same brand and type, they are likely to be subject to different operating conditions and will therefore likely have different tire model parameterizations. The tire model defines a relationship between current or future vehicle motion state and tire scrubbing. This means that the tire model can be seen as a function or mapping between vehicle motion state and tire scrubbing.

The tire model may also include additional aspects, as e.g., discussed above in connection to FIG. 2. For instance, the tire model may comprise just a linear approximation of the relationship between wheel slip and generated force determined from the slip stiffness parameter of the tire. As mentioned above, one key concept of the techniques disclosed herein is that the tire models and the different estimated and measured tire parameters may be repeatedly updated based on updated input data. This means that the tire models and various tire parameters will be kept up to date as the tire progresses through its life cycle, from a new tire to a tire which is almost worn out and in need of replacement. Consequently, the tire model will be more accurate compared to a tire model which is fixedly configured. Also, the tire model will react to misconfiguration, and remove any discrepancy between pre-configured data and actual behavior of the tire.

According to some examples, the tire model is configured to define a relationship between wheel slip and generated wheel force in longitudinal and lateral directions, as was discussed above in connection to FIG. 2. The VMM function of the vehicle 100 may advantageously use this tire model to perform MSD coordination in order to generate a desired global force distribution over the different vehicle units of a heavy-duty articulated vehicle in a more precise manner. For instance, in case an acceleration is desired, the VMM function may coordinate MSDs to generate wheel slips which together provide the desired force in the direction of the desired acceleration. The tire model is optionally configured to define a relationship between wheel slip, tire scrubbing force and both propulsion and braking wheel forces, or just one out of propulsion or braking.

According to some examples, the tire model is configured to model a rolling resistance of the tire. This means that the VMM function can compare different solutions to the MSD coordination problem in terms of rolling resistance and pick one which is associated with a reduced tire scrubbing force compared to the other solutions to the MSD coordination problem. Also, if the vehicle 100 comprises one or more liftable axles, then the VMM function may evaluate if lifting the axle would result in more favorable operation with respect to tire scrubbing force. This way the VMM function may optimize or at least improve vehicle control with the objective of attaining a reduced tire scrubbing force. Consequently, the methods disclosed herein advantageously potentially provide a reduced tire scrubbing force of the vehicle 100.

Optionally, the tire model Sa33 is configured to model a reduced tire scrubbing force of the tire, e.g., in dependence of vehicle state and/or maneuver. This means that one or more feasible solutions for generating a set of desired global forces by the different MSDs can be discarded since they result in excessive tire scrubbing force. This may, for instance, occur if the vehicle is cornering, where some control allocations result in heavy scrubbing. By incorporating a tire model comprising a tire scrubbing force output for different vehicle states and tire parameters, tire lifetime can be prolonged by avoiding vehicle maneuvers associated with high tire scrubbing force.

The tire model may also be configured to model a self-aligning torque of the tire. This self-aligning torque is sometimes a component in the MSD coordination function. Thus, having a fairly decent idea about the tire scrubbing force may simplify performing accurate vehicle motion management.

As mentioned above, the method also comprises obtaining Sb1 the vehicle model. By way of example, the provision of obtaining Sa1 the vehicle model comprises determining Sb16 a vehicle motion state.

Generally, vehicle motion state may comprise any one of vehicle linear speed, vehicle angular speed, vehicle linear acceleration, vehicle angular acceleration, wheel rotation speed, tire acceleration, tire normal load, slip angle, and steer angle. The vehicle motion state optionally also comprises any one of a longitudinal wheel slip of a respective wheel of the tire, lateral wheel slip of the respective wheel of the tire, a normal load of the respective wheel of the vehicle, an acceleration of the respective wheel of the vehicle, and a rotational velocity of the respective wheel of the vehicle.

Based on the above one or more vehicle motion states, the method comprises the step of configuring Sb15 the vehicle model. In other words, the method defines a vehicle model using the outputs from the motion estimation model as inputs.

The vehicle model may also contain data indicative of the applied torque on one or more wheels and use such data as control input to estimate the vehicle state.

Further, as also mentioned in relation to FIG. 6A, the method in FIG. 6B comprises determining Sb2 a nominal tire scrubbing force for a current relative axle load distribution during the maneuver. The nominal tire scrubbing force for the current relative axle load distribution during the maneuver is determined based on the obtained vehicle model and the obtained tire model.

Subsequently, as also mentioned in relation to FIG. 6A, the method in FIG. 6B comprises determining Sb3 an improved relative axle load distribution for the maneuver associated with a reduced tire scrubbing force compared to the nominal tire scrubbing force, based on the vehicle model and on the tire model.

Then, as also mentioned in relation to FIG. 6A, the method in FIG. 6B comprises controlling Sa4 the one or more motion support devices to provide the improved relative axle load distribution during the maneuver. The step of controlling Sb4 the one or more motion support devices to provide the improved relative axle load distribution during the maneuver is performed by any one of e.g., using the adjustable suspension systems and lifting or dropping one or more of the liftable axle(s). By adjusting the relative axle load distribution, e.g., by using the adjustable suspension systems, it become possible to reduce the tire scrubbing force. This may also generally have a positive impact on the fuel economy or the energy consumption.

Thus, by way of example, the step of controlling Sb4 the one or more motion support devices to provide the improved relative axle load distribution during the maneuver comprises adjusting Sb41 load distribution between different axles.

In addition, or alternatively, the step of controlling Sb4 the one or more motion support devices to provide the improved relative axle load distribution during the maneuver comprising adjusting Sb42 load distribution between non-steered and steered axles.

In addition, or alternatively, the step of controlling Sb4 the one or more motion support devices to provide the improved relative axle load distribution during the maneuver may comprise a step of coordinating Sb43 one or more motion support devices of the heavy-duty vehicle 100 to adjust a liftable axle. In general, the method here further comprises the step of determining Sb44 if a liftable axle is to be lifted or not so as to provide the improved relative axle load distribution.

In addition, or alternatively, the step of controlling Sb4 the one or more motion support devices to provide the improved relative axle load distribution during the maneuver may comprise a step of coordinating Sb44 one or more motion support devices of the heavy-duty vehicle 100 to adjust the active suspension systems.

In addition, or alternatively, the step of controlling Sb4 the one or more motion support devices to provide the improved relative axle load distribution during the maneuver may comprise a step of coordinating Sb45 one or more motion support devices of the heavy-duty vehicle 100 to engage an inter-axle differential locks between driven axles of the vehicle.

By way of example, the one or more motion support devices may be coordinated to control an inter-axle differential lock between a driven pair of wheel axles of a boogie device of the vehicle. In addition, or alternatively, the step of controlling Sb4 the one or more motion support devices to provide the improved maneuverability during the maneuver may comprise a step of coordinating Sb45 one or more motion support devices of the heavy-duty vehicle 100 to disengage an inter-wheel differential lock between wheels on an axle.

By way of example, the one or more motion support devices may be coordinated to control an inter-wheel differential lock.

In addition, or alternatively, the step of controlling Sb4 the one or more motion support devices to provide the improved relative axle load distribution during the maneuver may comprise a step of coordinating Sb46 one or more motion support devices of the heavy-duty vehicle 100 to increase a steering angles of a steered axle compared to kinematic steering. In this manner, it becomes possible to improve maneuverability of the vehicle at the cost of increased tire scrub and thus increased energy consumption In some examples, the step of controlling Sb4 the one or more motion support devices to provide the improved relative axle load distribution during the maneuver may include additional operational actions. Non-excluding examples are e.g., the step of obtaining Sb47 route information and controlling the one or more motion support devices to provide the improved relative axle load distribution during the maneuver ahead of any detected upcoming path curvature. Route information may generally be obtained from the navigational system of the vehicle, as is commonly known in the art. Hence, the vehicle 100 here comprises a navigational system in communication with the control unit 800, or any one of the other control units of the vehicle.

In another example, the step Sb4 comprises comparing the determined improved relative axle load distribution with one or more prevailing axle load limitations. The prevailing axle load limitations can be determined by using road sign recognition and vehicle position with geographical map data.

The method here also comprises controlling Sb5 the motion of the heavy-duty vehicle based on the tire model and on the determined vehicle motion state. Examples of the controlling was discussed in connection to, e.g., FIGS. 3 and 4 above. This means that the VMM function may have several possible solutions for how to generate a desired set of global forces and moments acting on the different vehicle units in the vehicle 100. Each solution can then be evaluated in terms of reduced tire scrubbing force by the tire model, and one which does not result in excessive tire scrubbing force can be selected. This type of function may be used to constrain vehicle motion management to only pick control solutions associated with limited reduced tire scrubbing force. The feature can also be used to provide warning signals to a driver when the driver performs vehicle controls which are associated with high tire scrubbing force. In this case, if the driver performs a maneuver which is harmful to the tires, a warning light or other notification means, such as an audible alarm signal, may be triggered in the cabin, and a message may be displayed informing the driver about the high tire scrubbing force currently generated.

The methods disclosed herein may furthermore comprise coordinating one or more motion support devices of the heavy-duty vehicle 100 to a desired effective wheelbase under constraints comprising fulfilment of a motion request. Thus, as for the tire scrubbing force, the VMM function may select between different MSD coordination solutions which all generate a set of desired effective wheelbases and select one which is associated with an acceptable effective wheelbase. By further considering selecting control allocations which are associated with the parameter effective wheelbase, the controllability of the vehicle may further be enhanced during the maneuver on the basis of both reduced tire scrubbing and effective wheelbase.

It is appreciated that many of the functions and features disclosed herein may be implemented independently from each other or in combination. In particular, the features relating to tire scrubbing force estimation may be implemented independently of the features relating to effective wheelbase estimation, or in combination as a more advanced tire model able to output more than one form of output data.

FIG. 6C is a flow chart illustrating a method for controlling axle load distribution of a heavy-duty vehicle 100 during a maneuver, and in particular for determining an improved relative axle load distribution for the maneuver associated with a reduced tire scrubbing force compared to the nominal tire scrubbing force, based on the vehicle model and on the tire model as well as on a desired effective wheelbase of the vehicle.

Accordingly, as also mentioned in view of FIGS. 6A and 6B, the method comprises the steps of obtaining Sc1 the vehicle model and the tire model, wherein the vehicle model and the tire model are jointly configured to predict the tire scrubbing force in dependence of the vehicle state comprising a relative axle load distribution during the maneuver, and subsequently determining Sc2 the nominal tire scrubbing force for the current relative axle load distribution during the maneuver, based on the vehicle model and on the tire model.

In addition, the method in FIG. 6C comprises the step of determining Sc3 the improved relative axle load distribution for the maneuver associated with the reduced tire scrubbing force compared to the determined nominal tire scrubbing force, based on the vehicle model, the tire model and a desired effective wheelbase of the heavy-duty vehicle during the maneuver.

It should be noted that there is generally a progressive relationship between tire scrubbing force and the maneuverability. For example, the maneuverability may partially increase by decreasing the effective wheelbase. Accordingly, it may in some situations be useful to strike a balance in between tire scrub force reduction and effective wheelbase reduction. According to one possible extension of the method, there is thus possible to define an optimization problem relating to reducing tire scrubbing and effective wheelbase, as described herein. The cost function here relates to a case that may have two potentially contradicting outcomes, such as the balance in between tire scrubbing force reduction and effective wheelbase reduction. However, as mentioned above, it should be noted that the tire scrubbing force reduction and the effective wheelbase reduction are not contradicting in general. As such, by way of example, the step of determining the improved relative axle load distribution for the maneuver based on the vehicle model, the tire model and the desired effective wheelbase of the heavy-duty vehicle comprises solving the herein described optimization problem as defined by means of the cost function.

More specifically, assuming the above-mentioned options of adjusting relative axle load distribution to decrease the tire scrubbing force and adjusting relative axle load distribution to decrease the equivalent wheelbase. Instead of selecting one of these two options, the method comprises the optional step of using the cost function to find an intermediate solution indicative of an improved relative axle load distribution that is favorable for both reducing tire scrubbing force and improving maneuverability. Such intermediate solution (improved relative axle load distribution) generally relates to the solution minimizing the cost function.

Thus, to sum up, in FIG. 6C, the step of determining Sc3 an improved relative axle load distribution for the maneuver associated with a reduced tire scrubbing force compared to the nominal tire scrubbing force comprises determining an improved relative axle load distribution for the maneuver associated with a desired effective wheelbase of the heavy-duty vehicle during the maneuver. That is, the method in FIG. 6c comprises determining an improved relative axle load distribution for the maneuver associated with a reduced tire scrubbing force compared to the nominal tire scrubbing force, and further associated with a desired effective wheelbase of the heavy-duty vehicle during the maneuver.

By way of example, the improved relative axle load distribution is determined by applying the above cost function to identify a relative axle load distribution, which is estimated to be favorable both for reducing tire scrubbing force and improving maneuverability. As mentioned above, there is a correlation between effective wheelbase and improved maneuverability.

Moreover, the determined improved relative axle load distribution corresponds to the relative axle load distribution minimizing the cost function. As such, the method applies the cost function so as to solve the above optimization problem by identifying the relative axle load distribution that minimizes the cost function.

In other words, in this example, the improved relative axle load distribution is determined by applying the cost function to identify a relative axle load distribution favorable both for reducing tire scrubbing force and improving maneuverability such that the cost function evaluate possible relative axle load distribution configurations for different effective wheelbases and tire scrubbing forces, wherein the improved relative axle load distribution is the solution that minimizes the cost function.

In addition, or alternatively, the step Sc3 may comprise determining a first improved relative axle load distribution for the maneuver associated with a reduced tire scrubbing force compared to the nominal tire scrubbing force and determining a second improved relative axle load distribution based on the desired effective wheelbase of the heavy-duty vehicle during the maneuver, and further selecting one of the first and second improved relative axle load distributions as the improved relative axle load distribution.

To this end, the method in step Sc3 may perform any one of using the cost function to find an intermediate solution indicative of an improved relative axle load distribution that is favorable for both reducing tire scrubbing force and improving maneuverability (relating to a reduced effective wheelbase) and determining a number of specific relative axle load distributions for the maneuver associated with a reduced tire scrubbing force and/or associated with a reduced (desired) effective wheelbase of the heavy-duty vehicle during the maneuver.

It should be noted that the optimization may generally be executed by the VMM function, e.g., by the VCU 130, 140 in the vehicle 100, and/or at least in part by the remote server 150. The optimization may generally take place in relation to the current safety, energy efficiency and maneuverability targets of the vehicle. In general, decreasing the tire scrub force and increasing maneuverability may not necessarily be obtained together. In one example, one of these two considerations may be prioritized over the other one. For example, for low speeds and tight areas, the maneuverability (desired effective wheelbase) may be favored, whilst for high-speed areas, decreasing the tire scrub force may be prioritised. In some situations, both tire scrub force and maneuverability may be improved with the same actions performed by the one or more motion support devices, while, in other situations, different actions may provide alternative improvement.

Finally, the method in FIG. 6C comprises the step of controlling Sc4 the one or more motion support devices to provide the improved relative axle load distribution during the maneuver.

In addition, the example embodiment in FIG. 6C may comprise controlling Sc4 the one or more motion support devices to provide the improved relative axle load distribution during the maneuver by coordinating a rear axle steering strategy together with a change of the equivalent wheelbase.

In the example embodiments described in relation to FIGS. 6A to 6C, the step Sa4 may further comprise coordinating Sc41 the one or more motion support devices of the heavy-duty vehicle 100 on the basis of the improved relative axle load distribution.

Hereby, the one or more motion support devices of the heavy-duty vehicle are coordinated to reduce the tire scrubbing under constraints comprising fulfilment of a motion request.

The provision of determining the current axle load distribution here also comprises determining an instant vertical load $F_z$ on each one of the wheels.

In addition, or alternatively, the step of determining Sa2 a nominal tire scrubbing force for a current relative axle load distribution during the maneuver, based on the vehicle model and on the tire model may comprise determining a tire scrubbing force of at least one tire of the vehicle on the basis of the tire model and the vehicle model.

In some example embodiments, the method may further comprise an additional step of determining a wheel slip limit for the vehicle motion control in dependence of a predetermined acceptable target tire scrubbing.

Moreover, the step of controlling Sc4 the one or more motion support devices to provide the improved relative axle load distribution during the maneuver here optionally comprises any one of adjusting vertical load on each one of the wheels, adjusting load on a single axle and adjusting load distribution between axles.

As mentioned herein, the improved relative axle load distribution can be determined with objective to reduce tire scrubbing force and further used to determine a vehicle configuration. For instance, suppose that the vehicle comprises one or more liftable axles, or an active suspension system which allows the VCU to adjust normal load on the different axles. In this case a normal load distribution resulting in reduced tire scrubbing force can be selected in favor of vehicle configurations which results in higher degrees of tire scrubbing force. Thus, tire scrubbing force on the vehicle 100 can be reduced, which is an advantage.

In particular, the improved relative axle load distribution can be determined with an intention to reduce tire scrubbing force and further used to determine a vehicle configuration having a certain desired effective wheelbase. In a similar vein to the above example, assuming that the vehicle comprises one or more liftable axles, or an active suspension system which allows the VCU to adjust normal load on the different axles. In this case a normal load distribution resulting in reduced tire scrubbing force can be selected in favor of a vehicle configurations defined by an effective wheelbase which results in higher degrees of tire scrubbing force. Thus, tire scrubbing force on the vehicle 100 can be evaluated in view of the effective wheelbase condition of the vehicle configuration.

As mentioned herein, the one or more estimated tire parameters generally comprises any of: tire wear, tire longitudinal stiffness, tire lateral stiffness, tire rolling resistance, tire peak friction, tire rolling radius, tire contact patch properties, tire balance properties and wheel alignment properties. These tire parameters can be used to "customize" the tire model to fit a given tire. This tire model will then provide a more accurate mapping between vehicle operating condition and tire scrubbing force, compared to a more general tire model which is not customized to fit a given tire. It is an advantage that the tire models proposed herein may be repeatedly updated, for at least part of the one or more tire parameters based on the input data. Thus, if the tire properties change over time, so will the model in order to maintain an accurate mapping between vehicle operating condition and tire scrubbing force.

Many different examples exist of how the vehicle control can be adapted to account for a tire scrubbing force as given by the tire model in dependence of the vehicle operating state. Tire scrubbing force can either be determined for a current vehicle state, i.e., how much the current vehicle state affects the tire in terms of tire scrubbing force or predicted for a future vehicle operation. For instance, suppose that the vehicle is approaching a turn and where there are several different options for negotiating the turn, i.e., steer by braking, steering by a steered axle, or a combination of the two. The tire model can then be consulted in order to determine the tire scrubbing force associated with the different control options, and the options associated with the smallest tire scrubbing force can be selected. It is appreciated that, if the method also is configured to output data related to, e.g., effective wheelbase, then a combination of the two selection criteria can be used, in order to find a control option which has a reasonable amount of tire scrubbing force and at the same time provides an acceptable effective wheelbase.

The method optionally comprises any one of controlling Sc42 the one or more motion support devices to provide the improved relative axle load distribution in dependence of the determined reduced tire scrubbing force corresponding to the vehicle motion state, controlling Sc43 the one or more motion support devices to provide the improved relative axle load distribution in dependence of the determined reduced tire scrubbing force corresponding to the vehicle motion state and the desired effective wheelbase corresponding to the vehicle motion state. This control of the one or more motion support devices can be performed, e.g., by adjusting a setting of a liftable axle of the vehicle in dependence of the determined reduced tire scrubbing force and/or a setting of an active suspension system the vehicle in dependence of the determined reduced tire scrubbing force.

The method also optionally comprises coordinating Sc44 one or more motion support devices of the heavy-duty vehicle 100 to the provide the improved relative axle load distribution during the maneuver under constraints comprising fulfilment of a motion request.

The vehicle control may furthermore be performed under a requirement of a maximum or at least preferred stopping distance, i.e., the vehicle may need to be required to be able to come to a full stop in a specified distance. In this case the method may comprise coordinating one or more motion support devices of the heavy-duty vehicle 100 to reduce a stopping distance of the heavy-duty vehicle 100.

It is appreciated that the methods steps discussed above in connection to FIGS. 6A-C can be freely combined.

Figures 7, 8:
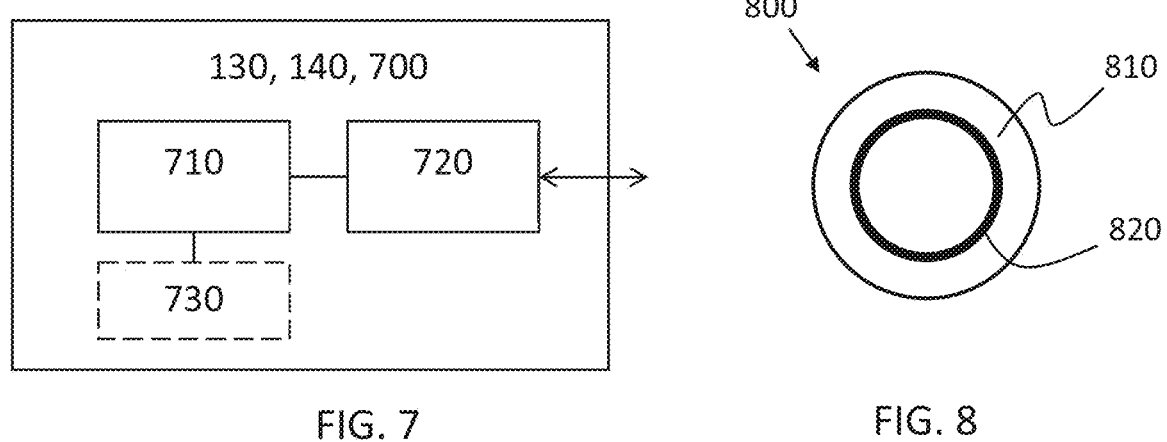
FIG. 7 schematically illustrates a sensor unit and/or a control unit.
FIG. 8 shows an example computer program product.

FIG. 7 schematically illustrates, in terms of a number of functional units, the components of a control unit 700 according to embodiments of the discussions herein, such as any of the VCUs 130, 140. This control unit 700 may be comprised in the articulated vehicle 1. Processing circuitry 710 is provided using any combination of one or more of a suitable central processing unit CPU, multiprocessor, microcontroller, digital signal processor DSP, etc., capable of executing software instructions stored in a computer program product, e.g., in the form of a storage medium 730. The processing circuitry 710 may further be provided as at least one application specific integrated circuit ASIC, or field programmable gate array FPGA.

Particularly, the processing circuitry 710 is configured to cause the control unit 700 to perform a set of operations, or steps, such as the methods discussed in connection to FIG. 6A to 6C. For example, the storage medium 730 may store the set of operations, and the processing circuitry 710 may be configured to retrieve the set of operations from the storage medium 730 to cause the control unit 700 to perform the set of operations. The set of operations may be provided as a set of executable instructions. Thus, the processing circuitry 710 is thereby arranged to execute methods as herein disclosed.

The storage medium 730 may also comprise persistent storage, which, for example, can be any single one or combination of magnetic memory, optical memory, solid state memory or even remotely mounted memory.

The control unit 700 may further comprise an interface 720 for communications with at least one external device. As such the interface 720 may comprise one or more transmitters and receivers, comprising analogue and digital components and a suitable number of ports for wireline or wireless communication.

The processing circuitry 710 controls the general operation of the control unit 700, e.g., by sending data and control signals to the interface 720 and the storage medium 730, by receiving data and reports from the interface 720, and by retrieving data and instructions from the storage medium 730. Other components, as well as the related functionality, of the control node are omitted in order not to obscure the concepts presented herein.

FIG. 8 illustrates a computer readable medium 810 carrying a computer program comprising program code means 820 for performing the methods illustrated in FIGS. 6A-C, when said program product is run on a computer. The computer readable medium and the code means may together form a computer program product 800.

The invention claimed is:

1. A method for controlling axle load distribution of a heavy-duty vehicle during a maneuver, wherein the heavy-duty vehicle comprises a number of wheel axles and one or more motion support devices arranged to adjust a relative axle load of one or more wheel axles of the number of wheel axles, the method comprising:

obtaining a vehicle model and a tire model, wherein the vehicle model and the tire model are jointly configured to predict a tire scrubbing force in dependence of a vehicle state comprising a relative axle load distribution during the maneuver;

determining a nominal tire scrubbing force for a current relative axle load distribution during the maneuver, based on the vehicle model and on the tire model;

determining, based on the vehicle model and the tire model, a cost scrub force function corresponding to the nominal tire scrubbing force;

determining, based on the vehicle model and the tire model, a cost maneuverability function corresponding to a desired effective wheelbase of the heavy-duty vehicle during the maneuver;

determining an improved relative axle load distribution for the maneuver associated with a reduced tire scrubbing force by reducing a combined cost function of the cost scrub force function and the cost maneuverability function; and controlling the one or more motion support devices to provide the improved relative axle load distribution during the maneuver.

2. The method of claim 1, wherein the tire model is parameterized by one or more tire parameters obtained from input data related to at least one parameter of a tire on the heavy-duty vehicle.

3. The method of claim 2, further comprising obtaining the input data related to the at least one parameter of a tire on the heavy-duty vehicle from one or more sensors arranged to measure one or more operating parameters of the tire.

4. The method of claim 3, wherein the input data relating to the measured one or more operating parameters comprise any one or more of: vehicle speed, wheel rotation speed, tire pressure, tire temperature, tire acceleration, tire strain, tire GPS position, weather, ambient temperature, rain classification data, amount of water on road, normal load, slip angle, steer angle, and applied torque on one or more wheels.

5. The method of claim 2, wherein the input data comprises data obtained from a memory related to tire design, wherein the data related to tire design comprises any one or more of: tire nominal dimension, tire structural characteristics, tire chemical composition, and tire history.

6. The method of claim 2, wherein the one or more tire parameters comprise any one or more of: tire wear, tire longitudinal stiffness, tire lateral stiffness, tire rolling resistance, tire peak friction, tire rolling radius, tire contact patch properties, tire balance properties and wheel alignment properties.

7. The method of claim 1, wherein the determined improved relative axle load distribution is determined by applying a cost function to identify a relative axle load distribution favorable both for reducing tire scrubbing force and improving maneuverability.

8. The method of claim 1, further comprising determining a first improved relative axle load distribution for the maneuver associated with a reduced tire scrubbing force compared to the nominal tire scrubbing force and determining a second improved relative axle load distribution based on the desired effective wheelbase of the heavy-duty vehicle during the maneuver, and further selecting one of the first and second improved relative axle load distributions as the improved relative axle load distributions.

9. The method of claim 1, further comprising coordinating the one or more motion support devices of the heavy-duty vehicle on the basis of the determined improved relative axle load distribution.

10. The method of claim 1, further comprising determining a wheel slip limit for a vehicle motion control in dependence of a pre-determined acceptable target tire scrubbing.

11. The method of claim 1, wherein controlling the one or more motion support devices to provide the improved relative axle load distribution during the maneuver comprises adjusting load distribution between different axles.

12. The method of claim 1, further comprising coordinating the one or more motion support devices of the heavy-duty vehicle to adjust active suspension systems.

13. The method of claim 1, further comprising coordinating the one or more motion support devices of the heavy-duty vehicle to engage an inter-axle differential lock between driven axles of the vehicle.

14. The method of claim 1, further comprising obtaining route information; and controlling the one or more motion support devices to provide the improved relative axle load distribution during the maneuver ahead of any detected upcoming path curvature.

15. A control unit for controlling axle load distribution of a heavy-duty vehicle during a maneuver, the heavy-duty vehicle comprising a number of wheel axles and one or more motion support devices arranged to adjust a relative axle load of one or more wheel axles of the number of wheel axles, the control unit configured to:

obtain a vehicle model and a tire model, wherein the vehicle model and the tire model are jointly configured to predict a tire scrubbing force in dependence of a vehicle state comprising a relative axle load distribution during the maneuver;

determine a nominal tire scrubbing force for a current relative axle load distribution during the maneuver, based on the vehicle model and on the tire model;

determine, based on the vehicle model and the tire model, a cost scrub force function corresponding to the nominal tire scrubbing force;

determine, based on the vehicle model and the tire model, a cost maneuverability function corresponding to a desired effective wheelbase of the heavy-duty vehicle during the maneuver;

determine an improved relative axle load distribution for the maneuver associated with a reduced tire scrubbing force by reducing a combined cost function of the cost scrub force function and the cost maneuverability function; and control the one or more motion support devices to provide the improved relative axle load distribution during the maneuver.

16. A vehicle comprising the control unit of claim 15.

* * * * *